United States Patent
Williams, Jr. et al.

(10) Patent No.: US 12,459,220 B2
(45) Date of Patent: Nov. 4, 2025

(54) ADDITIVE MANUFACTURE OF APPLICATION-SPECIFIC INORGANIC OPTICAL ELEMENTS

(71) Applicant: Vadient Optics, LLC, Tualatin, OR (US)

(72) Inventors: George Melville Williams, Jr., Vashon, WA (US); John Paul Harmon, Albany, OR (US); Thomas Leonard Allen, Milwaukie, OR (US)

(73) Assignee: Vadient Optics, LLC, Tualatin, OR (US)

( * ) Notice: Subject to any disclaimer, the term of this patent is extended or adjusted under 35 U.S.C. 154(b) by 0 days.

(21) Appl. No.: 18/880,980

(22) PCT Filed: May 28, 2024

(86) PCT No.: PCT/US2024/031229
§ 371 (c)(1),
(2) Date: Jan. 3, 2025

(87) PCT Pub. No.: WO2024/249398
PCT Pub. Date: Dec. 5, 2024

(65) Prior Publication Data
US 2025/0170790 A1    May 29, 2025

Related U.S. Application Data

(60) Provisional application No. 63/504,543, filed on May 26, 2023.

(51) Int. Cl.
*B29D 11/00* (2006.01)
*B29C 64/112* (2017.01)
(Continued)

(52) U.S. Cl.
CPC ...... *B29D 11/00355* (2013.01); *B29D 11/00* (2013.01); *B33Y 40/20* (2020.01);
(Continued)

(58) Field of Classification Search
None
See application file for complete search history.

(56) References Cited

U.S. PATENT DOCUMENTS

| | | | |
|---|---|---|---|
| 8,133,831 B2 | 3/2012 | Laubersheimer et al. | |
| 2010/0157437 A1* | 6/2010 | Higginson | G02B 1/00 977/773 |

(Continued)

FOREIGN PATENT DOCUMENTS

| | | |
|---|---|---|
| JP | 2011241138 A | 12/2011 |
| TW | 202006065 A | 2/2020 |

(Continued)

OTHER PUBLICATIONS

Destino, J. et al., "3D Printed Optical Quality Silica and Silica-Titania Glasses from Sol-Gel Feedstocks," Advanced Material Technologies, vol. 3, No. 6, Jan. 8, 2018, 10 pages.

(Continued)

*Primary Examiner* — Alison L Hindenlang
(74) *Attorney, Agent, or Firm* — Alleman Hall & Tuttle LLP

(57) ABSTRACT

An example method for making an optical element comprises: (a) receiving in a printing device a plurality of liquids, each including a volatile solvent, wherein one or more of the liquids also includes a suspension of particles or a sol-gel precursor; (b) receiving in the printing device a plurality of print maps corresponding to the plurality of liquids, each print map defining a pattern of application of the corresponding liquid for a series of pre-sintered layers of the optical element; (c) for each pre-sintered layer, operating (Continued)

the printing device to: (i) deposit the plurality of liquids according to the patterns defined in the plurality of print maps for that pre-sintered layer, and (ii) dry the pre-sintered layer; and (d) sintering the series of pre-sintered layers to form a vitreous monolith comprising the optical element.

25 Claims, 16 Drawing Sheets

(51) Int. Cl.
*B33Y 40/20* (2020.01)
*B33Y 80/00* (2015.01)
*G02B 3/00* (2006.01)
*B29K 105/00* (2006.01)
*B29K 105/16* (2006.01)
*B33Y 10/00* (2015.01)

(52) U.S. Cl.
CPC ............ *B33Y 80/00* (2014.12); *G02B 3/0087* (2013.01); *B29C 64/112* (2017.08); *B29K 2105/0061* (2013.01); *B29K 2105/162* (2013.01); *B33Y 10/00* (2014.12)

(56) References Cited

U.S. PATENT DOCUMENTS

| | | | |
|---|---|---|---|
| 2010/0225013 A1 | 9/2010 | Eiha et al. | |
| 2013/0249034 A1* | 9/2013 | Andre | G02B 3/0037 427/508 |
| 2016/0167299 A1* | 6/2016 | Jallouli | B29D 11/00009 264/2.6 |
| 2016/0299405 A1* | 10/2016 | Manion | B29D 11/00682 |
| 2017/0165931 A1 | 6/2017 | Wolterink et al. | |
| 2017/0173957 A1* | 6/2017 | Williams | B41J 2/164 |
| 2017/0297953 A1* | 10/2017 | Dupuy | C09D 11/322 |
| 2017/0368742 A1* | 12/2017 | Slep | B29D 11/00009 |
| 2018/0095190 A1* | 4/2018 | Frease | B24B 13/0055 |
| 2019/0039294 A1* | 2/2019 | Stasiak | B29C 64/165 |
| 2019/0211219 A1 | 7/2019 | Kondo et al. | |
| 2020/0024465 A1 | 1/2020 | Dylla-Spears et al. | |
| 2022/0260830 A1 | 8/2022 | Baleine et al. | |

FOREIGN PATENT DOCUMENTS

| | | |
|---|---|---|
| WO | 2009041707 A2 | 4/2009 |
| WO | 2020118157 A1 | 6/2020 |
| WO | 2021255337 A1 | 12/2021 |

OTHER PUBLICATIONS

Dylla-Spears, R. et al., "3D printed gradient index glass optics," Science Advances, vol. 6, No. 47, Nov. 18, 2020, 7 pages.

ISA United States Patent and Trademark Office, International Search Report and Written Opinion Issued in Application No. PCT/US24/31229, Aug. 28, 2024, WIPO, 9 pages.

Jancalek, J. et al., "Preparation of ternary spin-coated thin films by mixing binary As—S and As—Se glass solutions," Journal of Non-Crystalline Solids: X, vol. 17, Mar. 2017, 10 pages.

Sanchez, E. A. et al., "Chalcogenide glass microlenses by inkjet printing," Applied Optics, vol. 50, No. 14, May 10, 2011, 5 pages.

Sasan, K. et al., "Additive Manufacturing of Optical Quality Germania-Silica Glasses," ACS Applied Materials & Interfaces, vol. 12, No. 5, Jan. 14, 2020, 6 pages.

Sasan, K. et al., Supporting Information for "Additive Manufacturing of Optical Quality Germania-Silica Glasses," ACS Applied Materials & Interfaces, vol. 12, No. 5, Jan. 14, 2020. 10 pages.

Taiwan Intellectual Property Office, Office Action and Search Report Issued in Application No. 113119455, Apr. 1, 2025, 6 pages.

\* cited by examiner

| Material | Refractive Index (Visible) | Dispersion (Visible; µm^-1) | Refractive Index (SWIR) | Dispersion (SWIR; µm^-1) | Refractive Index (MWIR) | Dispersion (MWIR; µm^-1) | Refractive Index (LWIR) | Dispersion (LWIR; µm^-1) |
|---|---|---|---|---|---|---|---|---|
| Diamond | 2.42 | 0.044 | 2.4 | 0.055 | 2.4 | 0.056 | 2.4 | 0.057 |
| Sapphire | 1.77 | 0.014 | 1.76 | 0.017 | 1.75 | 0.019 | 1.74 | 0.021 |
| CaF$_2$ | 1.43 | 0.008 | 1.43 | 0.010 | 1.43 | 0.010 | 1.43 | 0.012 |
| MgF$_2$ | 1.38 | 0.003 | 1.38 | 0.005 | 1.38 | 0.006 | 1.38 | 0.007 |
| TiO$_2$ | 2.55 | 0.150 | 2.52 | 0.167 | 2.50 | 0.182 | 2.48 | 0.195 |
| ZnS | 2.34 | 0.206 | 2.24 | 0.277 | 2.20 | 0.317 | 2.15 | 0.355 |
| ZnSe | 2.44 | 0.470 | 2.38 | 0.628 | 2.35 | 0.715 | 2.31 | 0.802 |
| Ge | 4.00 | 0.370 | 4.00 | 0.380 | 4.00 | 0.390 | 4.00 | 0.400 |
| Si | 3.42 | 0.050 | 3.42 | 0.052 | 3.42 | 0.053 | 3.42 | 0.054 |
| Chalcogenide Glass | 2.30 | 0.180 | 2.40 | 0.460 | 2.50 | 0.780 | 3.00 | 1.080 |
| BK7 | 1.51 | 0.006 | 1.51 | 0.006 | 1.51 | 0.007 | 1.51 | 0.008 |
| WS2 | 2.46 | 1.070 | 2.46 | 1.360 | 2.46 | 1.500 | 2.46 | 1.610 |

*FIG. 11*

ADDITIVE MANUFACTURE OF APPLICATION-SPECIFIC INORGANIC OPTICAL ELEMENTS

CROSS REFERENCE TO RELATED APPLICATIONS

The present application is a U.S. National Phase of International Patent Application Serial No. PCT/US2024/031229, entitled "ADDITIVE MANUFACTURE OF APPLICATION-SPECIFIC INORGANIC OPTICAL ELEMENTS", filed May 28, 2024, which claims priority to and the benefit of U.S. Provisional Patent Application Ser. No. 63/504,543 filed 26 May 2023, the entirety of each of which is hereby incorporated by reference herein for all purposes.

TECHNICAL FIELD

This disclosure relates generally to additive manufacture and more particularly to additive manufacture of optical elements usable in different regions of the electromagnetic (EM) spectrum.

BACKGROUND

Optical materials such as glasses and ceramics are used extensively in fields such as optics, photonics, and electronics. Traditionally, optical materials are made using melt-quenching and solid-state sintering methods. However, these methods have limitations, such as high-temperature processing requirements, difficulties in achieving high-purity materials, and issues controlling the microstructure and properties of the final products.

SUMMARY

Some aspects of this disclosure relate to methods and hardware in the form of an apparatus for making an optical element. An example method comprises: (a) receiving in a printing device a plurality of liquids, each including a volatile solvent, wherein one or more of the liquids also includes a suspension of particles or a sol-gel precursor; (b) receiving in the printing device a plurality of print maps corresponding to the plurality of liquids, each print map defining a pattern of application of the corresponding liquid for a series of pre-sintered layers of the optical element; (c) for each pre-sintered layer, operating the printing device to: (i) deposit the plurality of liquids according to the patterns defined in the plurality of print maps for that pre-sintered layer, and (ii) dry the pre-sintered layer; and (d) sintering the series of pre-sintered layers to form a vitreous monolith comprising the optical element.

This Summary is provided in order to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

BRIEF DESCRIPTION OF THE DRAWINGS

FIG. 11 is a table of properties for example materials.

DETAILED DESCRIPTION

Figure 1:
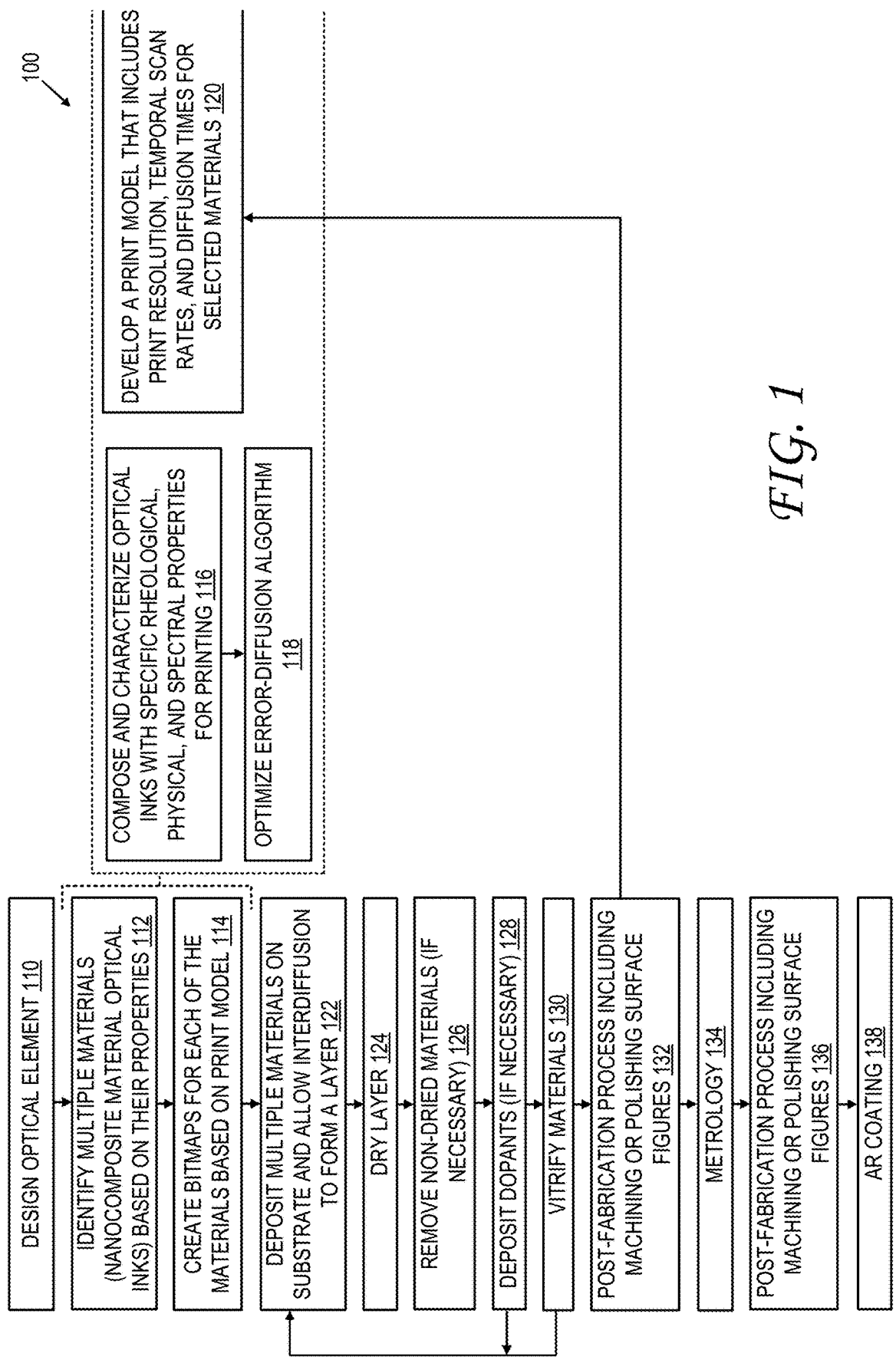
FIG. 1 shows aspects of an example method to manufacture bespoke optical elements.

Methods and hardware in the form of an apparatus for forming 'bespoke' (i.e., custom or application-specific) optical elements by inkjet deposition of different inorganic nanoparticles, precursors, and additives are disclosed. The methods involve blending various types of inorganic nanoparticles, selected for their spectral-dielectric properties. By depositing different concentrations of the nanoparticles and drying, densifying, or vitrifying the materials, the methods enable the creation of optical elements with bespoke complex dielectric electro-magnetic (EM) properties, including heterogeneous and gradient index (GRIN) materials, suitable for various applications in EM bands ranging from the ultraviolet (UV) through the radio-frequency (RF) band. The disclosed methods and hardware provide a cost-effective and scalable approach to producing optical elements with tailored properties, offering significant advantages over conventional manufacturing.

Various methods can be used to address the difficulties of optics manufacture. For example, sol-gel processing can be used to make optical glasses and ceramics with controlled properties. In this process, a precursor solution is prepared, which undergoes hydrolysis and condensation reactions to form a gel, which is subsequently dried and sintered to form the final product. The advantage of this process is that it can produce high-purity materials with controlled microstructures and properties.

Inkjet deposition has emerged as a promising approach to make optical materials. In this process, nanoparticles or precursors are suspended in a solution and deposited on a substrate using inkjet printing technology. The deposited material is then dried, densified, and vitrified to form the final product. This approach offers advantages such as precise control over the composition, uniformity of the material, and the ability to produce small feature sizes. Accordingly, inkjet deposition offers a promising approach for precise control over the composition and microstructure of the final product.

As noted above, this disclosure describes methods and hardware for manufacturing dielectric materials and devices (e.g., optical elements) using inkjet deposition, with precise control over the EM properties of the materials and devices, including optical-spectrum properties. The disclosed methods offer the potential for customization of the properties to suit specific applications. The methods involve suspending nanoparticles or precursors in solutions, with a specific colloidal nanoparticle composition in each of the printheads, and using inkjet-print deposition to perform patterned deposition of the individual solutions from each printhead onto a substrate, along with the suspended precursor nanoparticles, nanoglass, nanoceramics, and/or nanocrystals from other printheads. The composite materials in each printhead are chosen such that each has specific spectral-dielectric properties, so that when they are combined, the material deposited at each voxel assumes spectral-dielectric properties that are functions of the constituent materials interdiffused from each printhead. After deposition and interdiffusion, the deposited composite materials are dried, densified, and vitrified to form the final optical material with precisely controlled spectral-dielectric properties.

The approaches described herein also offer the advantage that precise control can be obtained over the composition, the uniformity of the material, and the refractive-index spectra, including dispersion and partial dispersion properties, with the ability to produce small feature sizes. Sub-wavelength (e.g., $<\lambda/20$) compositional gradients may be formed that avoid optical scattering. For example, the refractive index, the dispersion, and partial dispersion of an optical material may be precisely defined. The disclosed methods can be more generally applied to alter the complex dielectric properties of the materials, wherein the permeability, permittivity, or losses can be controlled by material variability.

The methods disclosed herein allow for bespoke optical materials to be fabricated with tailored complex dielectric or optical properties. The methods allow for the production of complex-shaped glass-ceramic optics with high accuracy and precision, and can be used in a variety of applications, including optical lenses, mirrors, and windows. The methods offer advantages over traditional methods of producing glass-ceramic substrates, including lower cost, greater flexibility in design, and improved quality control. At least some of the disclosed methods use multiple inkjet printing heads, each loaded with a different composition of materials. By carefully controlling the volume, position, and/or timing of the spatially patterned deposition of multiple materials from respective print heads, and controlling interdiffusion in the substrate, after drying and vitrification, these methods enable the realization of complex compositional contours, which allow for complex spectral-dielectric properties, including the refractive index, the dispersion, and partial dispersion, to be controlled throughout the volume.

The inkjet deposition process can be used to create complex three-dimensional and freeform optical structures, making it useful for creating optical materials for applications such as micro-optics, phase plates, optical fibers, and waveguides, as well as gradient index optics, wherein, for example, the refractive index, dispersion, and partial dispersion of the constituents are varied by blending multiple constituents. At least some of the disclosed methods involve preparing multiple optical ink compositions, each containing one or more of glass, semiconductor, metal, or ceramic nanoparticles, precursors, additives, or solvents, and then using an inkjet printer to deposit multiple different composition inks onto a substrate. The printed substrate is then heated to remove the solvent, and then sintered to convert the glass particles into a glass-ceramic material. The resulting glass-ceramic substrate has a high transparency and a uniform microstructure, making it suitable for use in various optical applications.

At least some of the disclosed methods involve preparing and depositing a precursor solution containing glass particles, a solvent, and a binder polymer, and then printing the solution onto a substrate using an inkjet printer. The printed substrate is then heated to remove the solvent and binder polymer, and then sintered to convert the glass particles into a glass-ceramic material.

At least some of the disclosed methods involve preparing multiple optical ink compositions, and then using an inkjet printer to deposit multiple different composition inks onto a substrate in predetermined patterns, such that a multi-dimensional pattern of constituent concentrations may be formed. When the printed ink is then dried and heated to sinter the glass-ceramic particles together, a dense glass-ceramic body is formed.

In some variants, a radial, axial, three-dimensional (radial and axial), or freeform gradient index (GRIN) optical element may be formed. In some variants, the disclosed methods involve preparing and inkjet depositing small sized nanoparticles, additives, dopants, sintering agents, and/or precursor solutions on the dried solid, before vitrification to increase the density of the solid and tailor its spectral-dielectric properties. In some variants this process is enacted after each layer is deposited, or after multiple layers have been deposited and dried, but before vitrification. In some variants, doping is performed post-drying using methods other than inkjet print deposition. Furthermore, the materials may be selected such that the properties of materials are optimized with respect to temperature, including the coefficient of thermal expansion (CTE) properties of the mixed materials.

The approach proposed in this disclosure differs from previous work on inkjet deposition of optical materials in several ways. First, this approach involves the deposition of multiple types of inorganic nanoparticles, including nanoglasses, nanoceramics, nanocrystals, and inorganic precursors or inorganic sintering materials deposited using multiple printheads and mixed or blended, in specific ratios, on the substrate. This enables the creation of a wider range of optical properties than can be achieved with a single type of nanoparticle or set of precursors. The use of multiple constituent materials allows for materials to be composed with precise control over both index and dispersion and allows for gradient index optics to be fabricated with independent control over dispersion and partial dispersion. These properties cannot be achieved using single or binary nanoparticle mixtures.

FIG. 1 shows aspects of an example method 100 used to manufacture bespoke optical elements. Briefly, method 100 of FIG. 1 comprises: designing an optical element at 110; identifying multiple materials (e.g., nanocomposite material optical inks) based on their properties at 112; and creating bitmaps (e.g., as print maps) for each of the materials based on a print model at 114. As part of operations 112 and/or 114, method 100 can further comprise: composing and characterizing the materials (e.g., optical inks) with specific rheological, physical, and spectral properties for printing at 116; optimizing an error-diffusion algorithm at 118; and developing a print model that includes a print resolution, temporal scan rates, and diffusion times for the selected materials (e.g., optical inks) at 120. Method 100 further comprises: depositing multiple materials (e.g., optical inks) on a substrate and allow interdiffusion to form a layer at 122; drying the layer at 124; removing non-dried materials (if necessary) at 126; and vitrifying the remaining materials at 130 to form a vitrified layer. From operations 128 and/or 130, additional layers can be formed by repeating operations 122, 124, 126, 128, and/or 128 over additional cycles. Method 100 further comprises: post-fabrication processing at 132, including machining and/or polishing surface figures; performing metrology at 134; post-fabrication processing at 136, including machining and/or polishing surface figures; and applying an AR coating at 138. Aspects of method 100 summarized above are described in further detail herein.

The method utilizes custom optical feedstock composed of precursors, nanoparticles, binders, and solvents, which are assembled into a library of optical inks, each with specific temperature-dependent spectral-dielectric properties and know physical, chemical, and rheological properties.

As an example, the nanoparticles can be fabricated by flow-synthesis or ball-milling, and after ligand functionalization they can be suspended in solvents and readied for inkjet print deposition. A set of about a half dozen nanoparticles allow for a wide range of glasses to be synthesized.

The role of the inkjet printer is to multiplex the different primary optical inks with sub-micron precision. Primary optical inks are loaded into separate inkjet print heads and deposit different ratios of droplets from each printhead containing the 'primary' optical inks. One or more of these optical inks are deposited onto a surface. Diffusion of the constituents then allows sub-wavelength smooth gradients to be created.

The nanoparticles newly deposited will interdiffuse with the nanoparticles from adjacent voxels and create composite blends of multiple nanoparticles that define the optical properties of the material. The resulting spectral refractive index is a weighted average of the constituents.

Using 'print composition', which mixes materials on the substrate, creates intermediate index values of the gradient profile. Print composition creates intermediate refractive index values by printing different concentrations of primary optical inks on the substrate. When one co-deposits specific mixes of different types of nanoparticles it is possible to create composite optical ceramics with arbitrary (i.e., target or intended) intermediate index and dispersion properties.

To construct each patterned layer of the optic, a separate bitmap for each printhead is used to determine the temporal-spatial deposition of each optical ink. 'Halftoning' algorithms are used to quantize the index profiles of the design and determine the quantization level, which is set by the number of primary optical inks used for fabrication. After quantizing a voxel element, the residuals of the quantization are distributed to neighboring voxels that have not yet been processed. The method continues until the layers of print maps for each printhead are complete.

The pattern of deposited droplets result in patterned concentrations of materials after interdiffusion with neighboring droplets. By precisely depositing specific nanoparticles, it is possible to create a sub-wavelength mix with a spectral refractive index that matches the desired spectral characteristics. This versatile approach allows for the creation of materials with any index and dispersion value, for example by computing the ratio of drops from two printheads containing precise linear blends of different nanoparticles, and allows for binary composition of materials using two printheads. It will be understood that any suitable combination of two, three, four, five, or more different constituents can be used to obtain resulting materials for an optical element having any suitable index and dispersion value at each voxel or a three-dimensional array of voxels that collectively form the optical element.

A feature of multi-constituent nanocomposite optical inks is that it is possible to precisely tailor the refractive index spectra of the optical inks relative to one another, to control primary and secondary color. Concurrently printing multiple inks also provides the degrees of freedom for controlling dispersion and secondary color.

This results in patterns of varying material composition, which are defined by the local concentrations of all constituents of the co-deposited optical inks. After polymerization or crosslinking, the local refractive index spectra assume a value that can be approximated by the weighted average of the constituent spectral properties.

As the number of primary optical inks is increased to include intermediate-index values, multi-level halftoning may be used, which reduces quantization error and enables more precise control over the gradient index patterns. The stack of print maps, one for each printhead at each layer, is uploaded or otherwise provided to the printer when fabricating the optic. Industrial printers control the drop placement of the optical inks, better than one-micron precision, and after inter-diffusion and polymerization of the different concentrations of droplets, optical inks and polymerization, it is possible to manufacture complex sub-wavelength-smooth gradient profiles.

Figure 2:
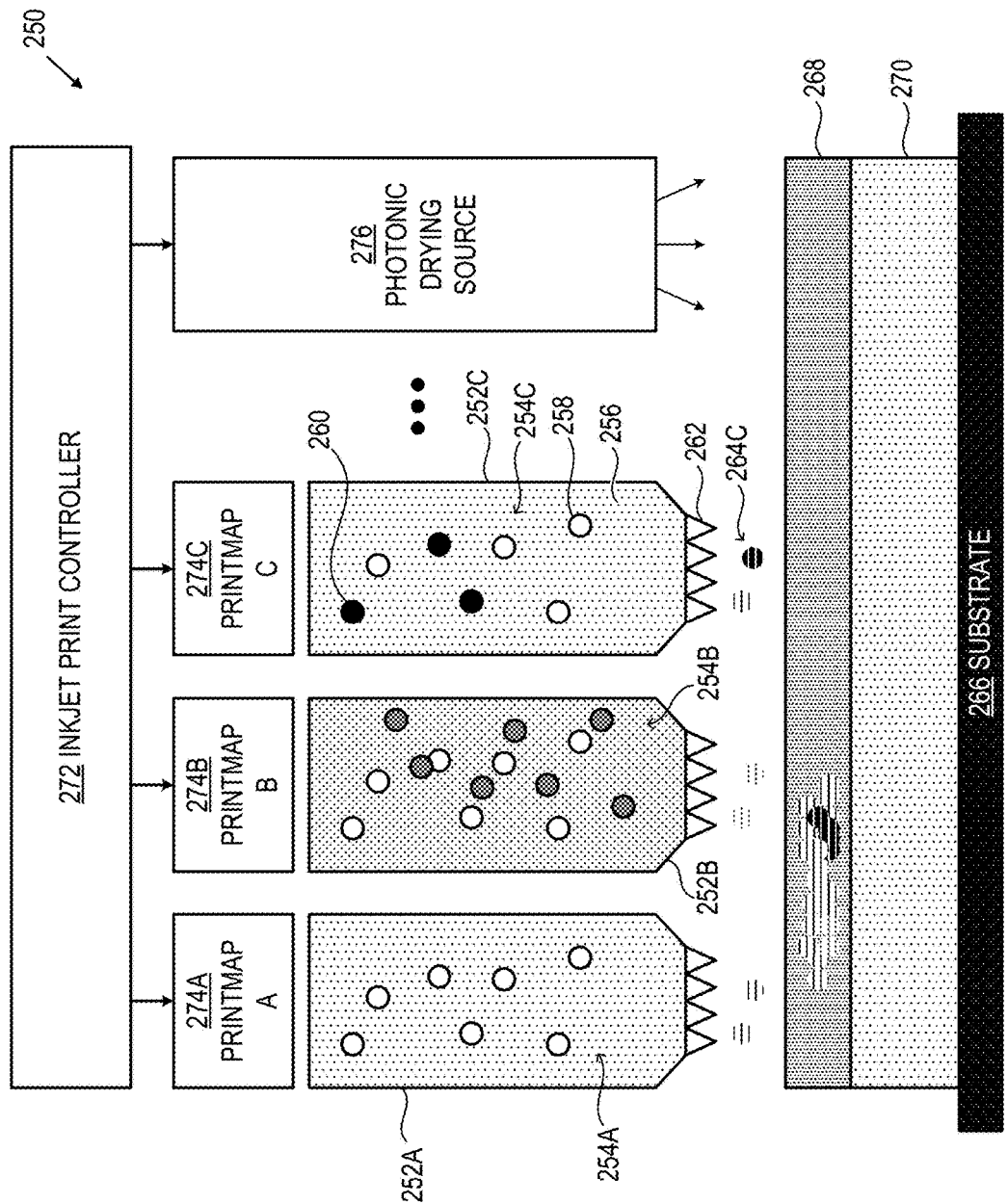
FIG. 2 shows aspects of an example of an apparatus that may be used to manufacture bespoke optical elements.

FIG. 2 shows aspects of an example of an apparatus 250 that may be used to create bespoke optical elements—e.g., bespoke inorganic optical elements comprising three deposited, composite, optical inks. While this example utilizes three different optical inks, it will be understood that any suitable quantity of multiple, different optical inks can be used, such as two, four, five or more different optical inks.

Apparatus 250 includes a respective printhead reservoir and printhead nozzle (e.g., nozzle array) for each optical element. For example, apparatus 250 includes printhead reservoir 252A, which contains optical ink A. Optical ink A may comprise a single nanoparticle and a solvent, in some examples. The apparatus also includes additional printhead reservoirs, which in this example includes printhead reservoirs 252B and 252C.

Optical ink 254A is arranged within printhead reservoir 252A; this optical ink includes a nanoparticle species, solvent, and optional additive. Optical ink 254B is arranged within printhead reservoir 252B; this optical ink includes a nanoparticle species, solvent, and optional additive. Optical ink 254C is arranged within printhead reservoir 252C; this optical ink includes a nanoparticle species, solvent, and optional additive. The nanoparticle species can differ among each of optical inks 254A, 254B, and 254C. Additionally or alternatively, the optional additive can differ among each of optical inks 254A, 254B, and 254C. Referring to optical-ink 254C of printhead reservoir 252C, this ink includes at 256 a solvent constituent C1, at 258 a nanoparticle constituent C2, and at 260 an additive element or nanoparticle constituent C3.

Apparatus 250 includes a printhead nozzle array 262 for each printhead reservoir. Each printhead reservoir is capable of emitting an optical ink droplet of its optical ink-droplet 264C for printhead reservoir 252C, and so forth. In this manner, apparatus 250 may form on substrate 266 an ensemble of layers, which include a solution-deposited layer 268 arranged on top of one or more dried underlayers 270.

In this example, three or more optical inks 254A, 254B, and 254C are loaded into inkjet printhead reservoirs 252A, 252B, and 252C, respectively, and deposited in ratios that result in a material with optical properties proportional to the volumetric average of the mixture deposited, after solvents are removed by drying. Inkjet print controller 272 may include printhead-driving electronics, a gantry for mechanically moving the printheads relative to the substrate, and a computational element, that includes the bitmaps—viz., print maps 274A, 274B, 274C in the drawings—which control the temporal-spatial firing patterns for each printhead at each layer.

Inorganic precursors can be used to synthesize optical materials, with index and dispersion values precisely matched to the variety of fielded optical materials. Inorganic self-assembled monolayers (SAM) ligands, can be used to help coordinate the deposited nanoparticles to the substrate. Inorganic ligand functionalization of the nanoparticle surfaces can be used to achieve tighter nanoparticle packing as they dry.

After each layer is deposited, the layer may be dried using various methods. There are several methods that can be used, individually or in combination, to remove solvents and dry nanoparticle layers to create dense layers that shrink vertically. As an example, thermal annealing heats the substrate to a high temperature to evaporate the solvent and promote particle sintering. As another example, vacuum drying places the sample in a vacuum to evaporate the solvent and remove any residual moisture. As another example, UV/ozone treatments expose the sample to UV light and ozone to oxidize the solvent and promote solvent removal. Chemical sintering can be used to remove the stabilizer on the surface of the particles using a fusing solution. During this process, the surface-bound ligands can serve as nucleation sites for the formation of the ceramic phase, promoting densification and bonding between the nanoparticles.

Apparatus 250 includes a photonic drying source 276. Photonic drying is a method that uses intense flashes of light to rapidly evaporate solvents from nanoparticle layers. This method involves exposing the layer to a pulsed light source, such as a xenon flash lamp, which generates heat that rapidly evaporates the solvent. The high energy density of the light source allows for very rapid drying times, on the order of milliseconds, and can result in highly uniform and dense nanoparticle layers. After drying and vitrification, optical elements with precise spectral properties are created.

Figure 3:
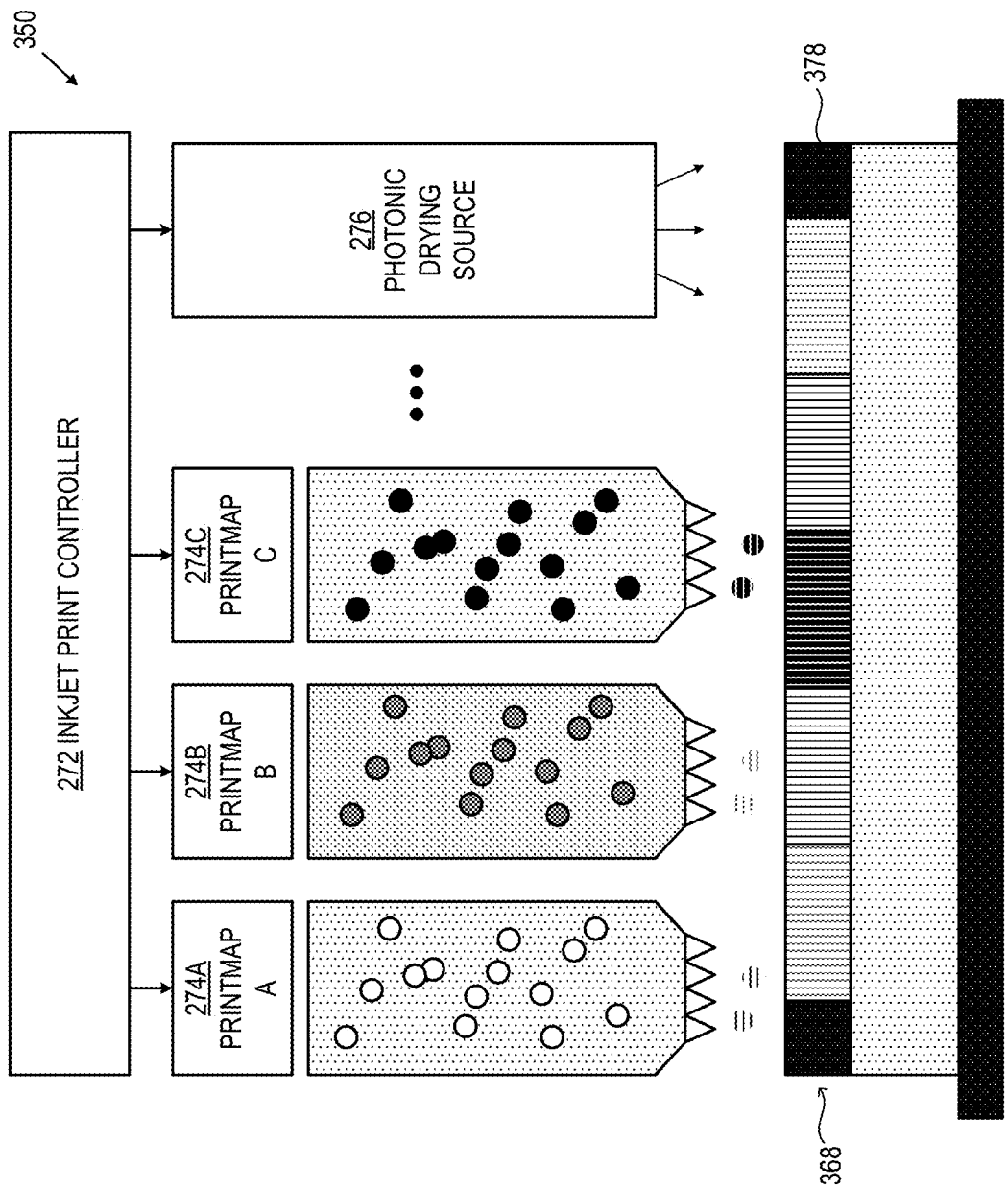
FIGS. 3 and 4 show aspects of an example apparatus for inkjet printing of anisotropic, patterned, bespoke inorganic optical elements.

FIG. 3 shows aspects of an example apparatus 350 for inkjet printing of anisotropic, patterned, bespoke inorganic optical elements. Apparatus 350 can include some or all of the previously described features of apparatus 250 of FIG. 2. FIG. 3 shows three deposited composite optical inks for purposes of illustration. In this example, the inks are deposited in specific patterns such that a gradient dielectric property device, such as a gradient index (GRIN) lens or a tapered resistance card (R-card) may be created. In this example, apparatus 350 operates to form a patterned solution-deposited layer 368. A boundary layer 378 is used to create a well to contain less-viscous components of layer 368. After a fixed time, the layer is dried, locking into the compositional gradients formed with sub-wavelength accuracy. Shown in 378 is a printed or deposited boundary layer, which creates a well that can contain viscous materials to prevent slumping of the materials as they are deposited.

Figure 4:
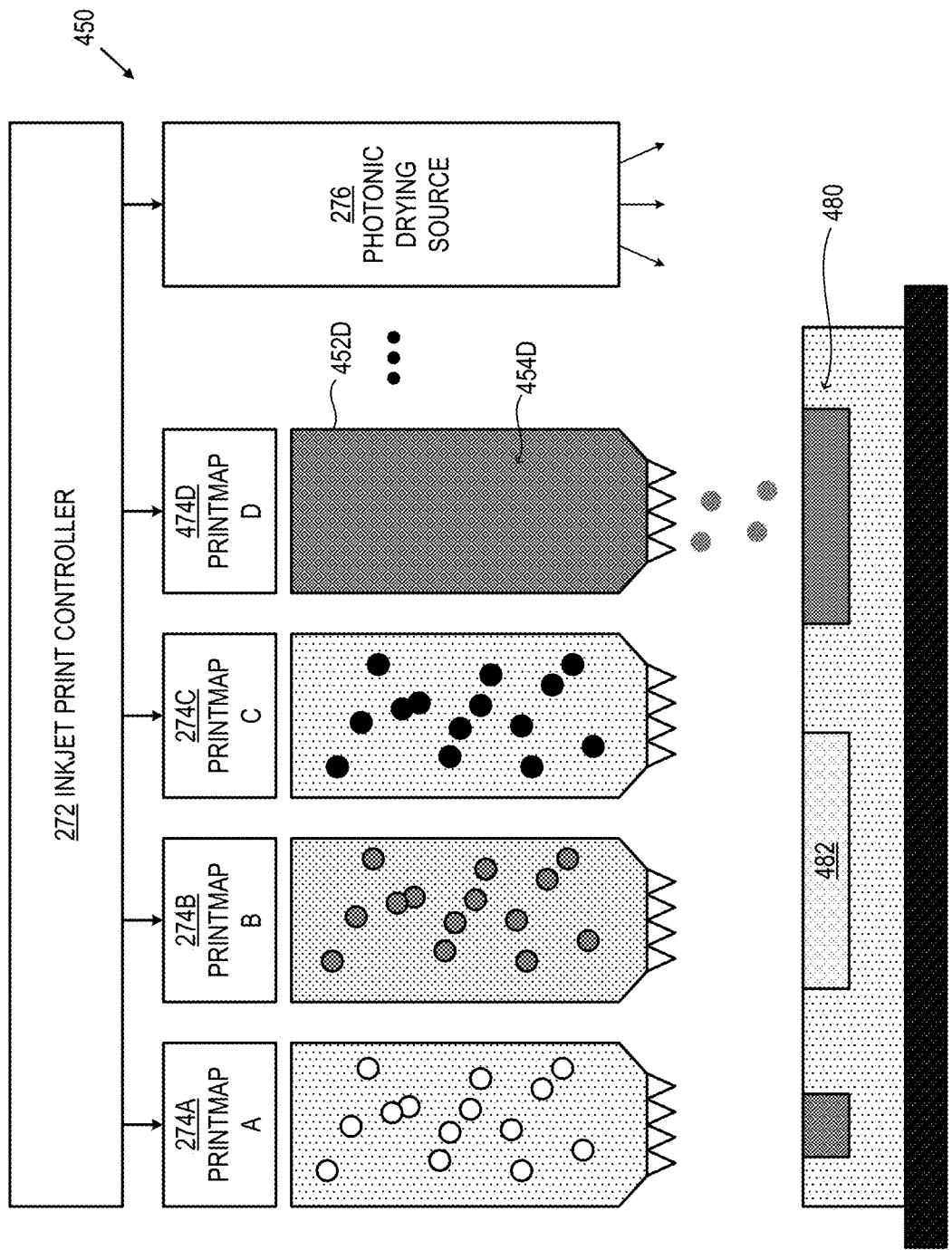

FIG. 4 shows aspects of an example apparatus 450 for inkjet printing of anisotropic, patterned, bespoke inorganic optical elements, illustrating post-dry doping of the various layers. Apparatus 450 can include some or all of the previously described features of apparatus 250 of FIG. 2. In this example, after the layer is dried, the dopants, sintering agents, or other additives, post-dry optical ink 454D from printhead reservoir 452D are deposited into the dried layer, resulting in a doped dried layer 480, which includes a post-dried sacrificial layer 482. The post-drying optical inks may be deposited using a variety of methods including atomic layer deposition (ALD), chemical vapor deposition (CVD), metalorganic chemical vapor deposition (MOCVD), and others. In this example, the dopants are deposited, in patterns, using inkjet print deposition. The sacrificial layers may be removed after drying.

Figure 5:
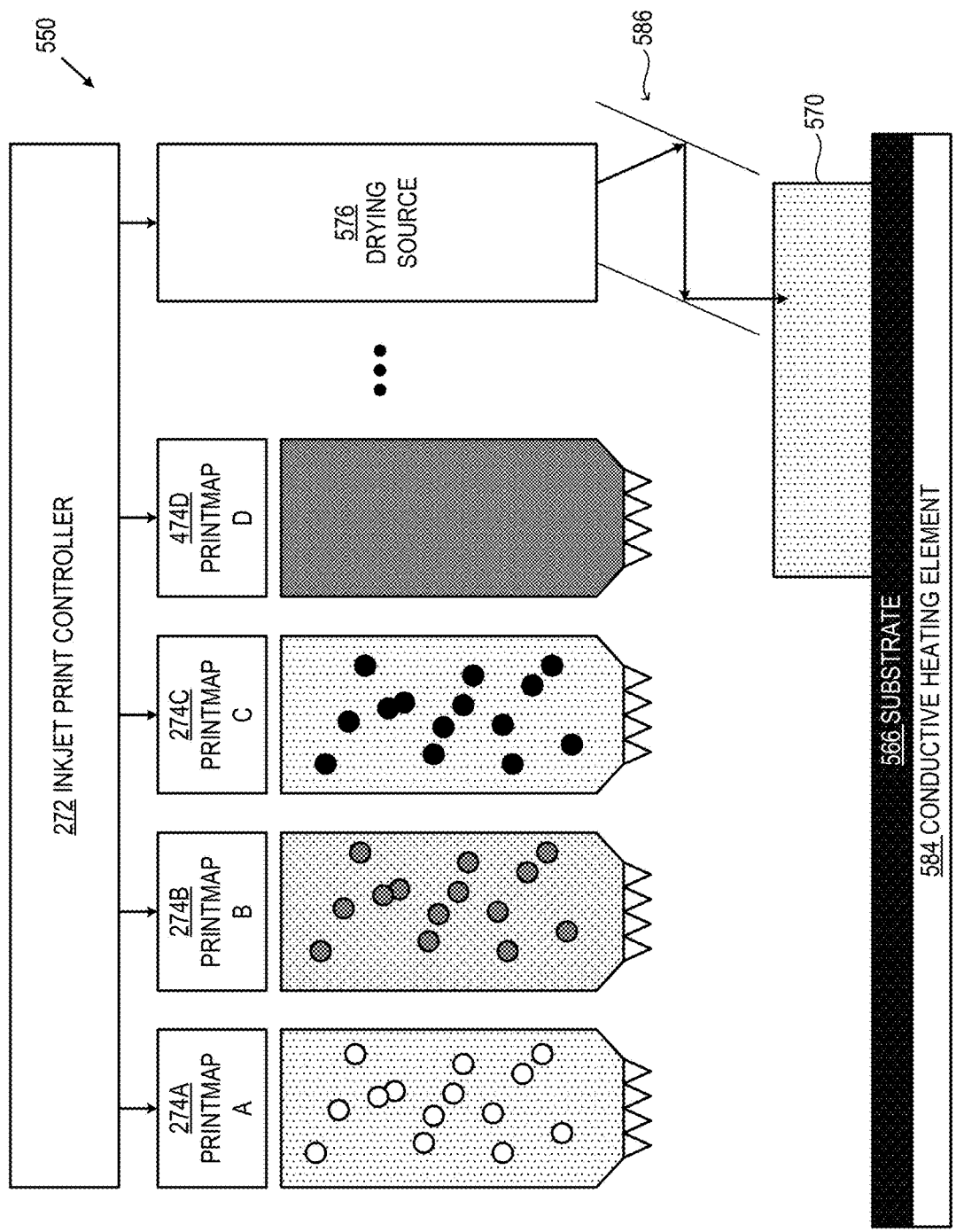
FIG. 5 shows aspects of an example apparatus for inkjet printing of anisotropic, patterned, bespoke inorganic optical elements via patterned drying.

FIG. 5 shows aspects of an example apparatus 550 for inkjet printing of anisotropic, patterned, bespoke inorganic optical elements via patterned drying. Apparatus 550 can include some or all of the previously described features of apparatus 250 of FIG. 2. Drying source 576 of apparatus 500 has independent spatial patterning, including a two-dimensional tip/tilt optical system for patterning the drying operation. This results in patterned underlayers 570 of the dried layer. In some examples, apparatus 550 includes a conductive heating element 584 to support the patterned drying. Here the patterning can be performed using a combination of one or both of gantry movement and movement of tip/tilt mirror 586, which may, for example, raster scan a laser across the surface to dry the layer in select patterns. Methods similar to flash laser annealing used in the semiconductor industry may be used.

Fabricating optical components for specific applications presents a challenge because ideally the materials should precisely match the refractive index, dispersion, and partial-dispersion properties desired for a target design. Any refractive index mismatch within the operating temperature range can cause scattering and chromatic aberrations, resulting in loss of contrast and resolution. This challenge is addressed by creating a library of high and low index nanoparticles, which have a range of dispersion values. By mixing or blending nanoparticles with different dispersion values, and incorporating various inorganic dopants, one may precisely tailor the refractive index spectra of the materials. This allows creation of GRIN profiles with independent control over dispersion and allows the printing of achromatic and apochromatic lenses for operation in wide spectral bands, as an example.

In at least some examples, small-sized nanoparticles (e.g., diameter<10 nm) can be created using hydro-thermal, solvo-thermal methods, or ball-milling, which are used to tailor the refractive index and dispersion of composite glass materials. As an example, nanomaterials can be selected from four or more non-toxic nanoparticles such as $BaF_2$, $ZrO_2$, $TiO_2$, ZnS, ZnSe, Ge, and a range of chacolgenide glass (ChG) glass compositions, which have a range of index values in the UVO through infrared spectral range. After characterization, these nanoparticles can be dispersed in solvents to create 'primary' optical inks whose properties bound the range of possible intermediate optical properties. As an example, the printed nanoparticle suspensions will be about 50% loaded with nanoparticles. However, other suitable values can be used depending on implementation and design of the optical element.

Materials that can be used for visible and short-wave infrared (SWIR) optics include a wide variety of crystalline materials and glasses. Notable among these are $BaTiO_3$, $TiO_2$, ZnS, and ZnSe, which span the visible through infrared. Materials that can be used for mid-wave infrared (MWIR) optics include silicon (Si), germanium (Ge), calcium fluoride ($CaF_2$), magnesium fluoride ($MgF_2$), zinc sulfide (ZnS), zinc selenide (ZnSe), and chalcogenides such as IRG26, IG6, and $As_{40}Se_{60}$. Ge is of particular interest because its dispersion increases significantly in the MWIR compared to the long-wave infrared (LWIR). Ge also has a very high Abbe number in the LWIR, making it possible to create an optical system without need for additional glass types to correct for color. For LWIR optics, materials can include Ge, ZnS, ZnSe, and sodium chloride (NaCl). AMTIR glasses, including AMTIR-1 and AMTIR-3, and their competitive equivalents, are also used. These glasses are chalcogenide glasses and have compositions of $Ge_{33}As_{12}Se_{55}$ and $Ge_{28}Sb_{12}Se_{60}$, respectively.

Chalcogenide glasses (ChGs) are a type of amorphous material that contains chalcogen atoms, which are elements from group 16 of the periodic table, including sulfur(S), selenium (Se), and tellurium (Te). These chalcogen atoms are covalently bonded with electropositive elements, which are usually elements from group 15 (As, Sb, Bi) and/or group 14 (Si, Ge, Sn, Pb), as examples. Chalcogenide glasses can be binary, ternary, or quaternary blends of these elements, resulting in a wide range of dispersive characteristics.

Chromatic dispersion is the change of an optical material's index of refraction with wavelength. In many cases, the refractive index of a medium decreases as the wavelength increases. If not corrected for, dispersion can limit the spectral range over which satisfactory imaging can occur in a refractive design.

Overcoming the limitations of classical achromatic material identification urges investigating not only the dispersive aspects of a material over a spectral region but its volatility as well. To do this one may drill down beyond the cursory formulations of the dispersive nature via more rigorous mathematical treatments. A linear multistep method uses a combination of $n(\lambda\_i)$ and $n(\lambda\_i')$ to calculate the instantaneous value of dispersion and its relative rate of change, namely the partial derivatives of the spectral response: $\partial n(\lambda i)/\partial xi$. The second-order partial derivative's value and thereby the volatility for any point along the spectral-response curve. Here, the desired increment is based on not only the material's general dispersive delta but also its predicted rate of change for each incremental step $\lambda\_n+i$: $f'(\lambda)=\lim h\to 0\ ([f(n(\lambda\_i+h))-f(n(\lambda\_i))]/h$. This identifies the material's natural resonance or response to spectral energy. Its spectral response and the ability to identify any natural 'frequencies' in its dispersive spectrum allow a selection of the most natural pairings to deliver relaxed well-corrected super-achromatic performance across any finite region and, more importantly, will directly relate its capacity to remain as such over wider bands simply by increasing the spectral bandwidth of the analysis. Any nodal point in the second-order partial derivation is a maximization of the dispersive volatility and as such should ideally be matched to its complementary material in the achromat: $f'(\lambda)=\lim h\to 0\ ([f'(n(\lambda\_i+h))-f'(n(\lambda\_i))]/h$.

One way of minimizing the dispersive characteristics of an optical design is to use two differently powered materials with different dispersive values (quantified by their V-numbers) to formulate a matched pair capable of delivering a satisfactory image corrected for at least two wavelengths in the spectrum of interest. In at least some examples, the optimal selection is two materials whose V-numbers differ enough to avoid inducing higher-order aberrations into a design. This approach, however, does not work well for optical systems with very wide spectral ranges. The nonlinearity of a material's dispersive function is one of the primary contributors to the aberrant imaging in wider-band optical systems; it will most often manifest itself in a form of higher-order chromatic aberration or nonlinear residual color that can be extremely difficult to control. This less-well-known family of aberrations, most often considered a nuisance in designs for limited spectral ranges, becomes more severe as the spectral range of the design is enlarged.

Figure 6A:
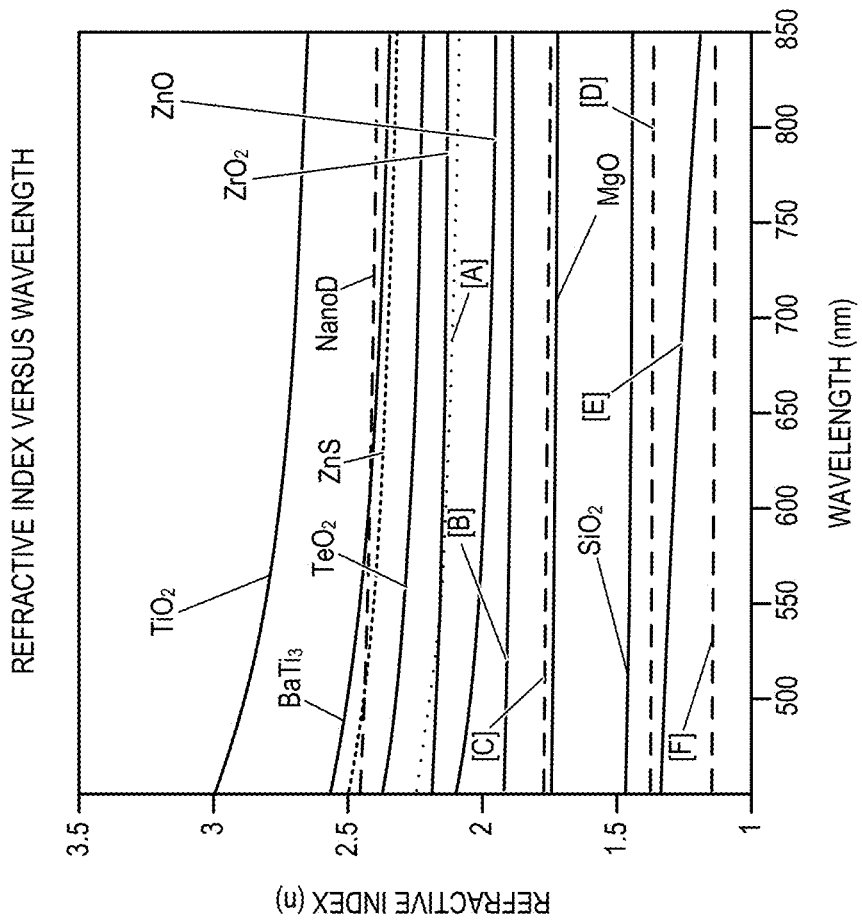
FIGS. 6A, 6B, and 6C show aspects of example of nanomaterials that may be used for optimizing devices for at least the visible wavelength band.
Figure 6B:
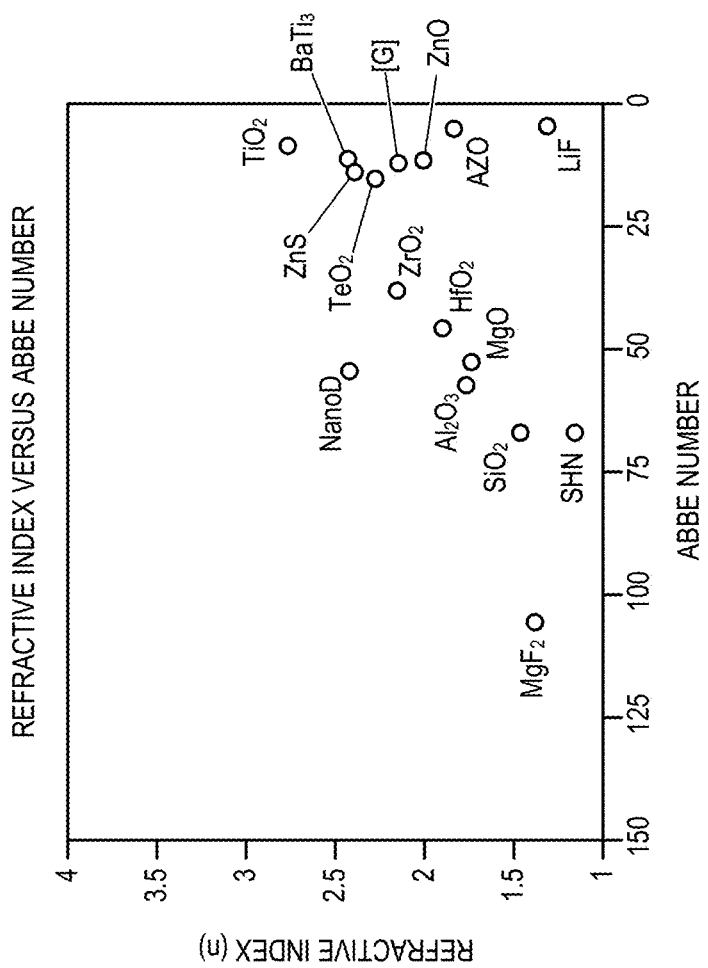
Figure 6C:
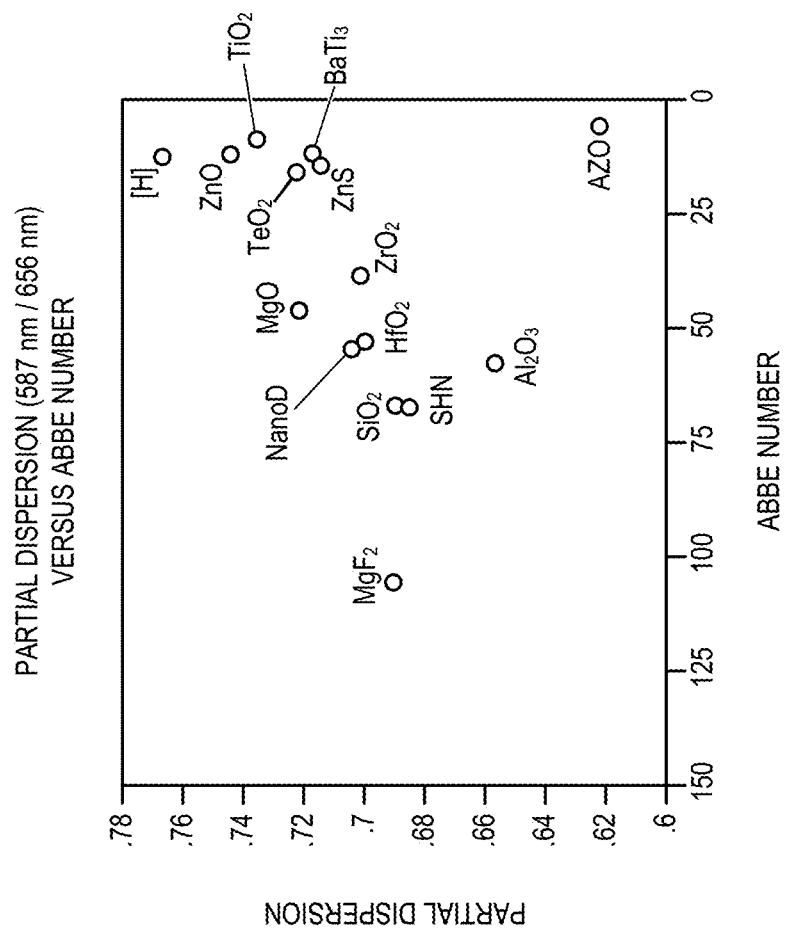

FIGS. 6A, 6B, and 6C show aspects of example of nanomaterials that may be used for optimizing devices for the visible wavelength band. FIG. 6A shows the index of refraction of selected inorganic materials. FIG. 6B shows the index of refraction of selected inorganic materials plotted as a function of dispersion parameterized by the Abbe number. FIG. 6C shows the index of refraction of selected inorganic materials plotted as a function of dispersion parameterized by the Abbe number. The spectral index of refraction is shown as a function of wavelength in FIG. 6A. These curves are parameterized in FIG. 6B, which shows the index of refraction plotted as a function of the Abbe number, which is a parameterization of dispersion, and is calculated as $v=(n_{mid}-1)\ (n_{short}-n_{long})$. In this example, $n_{short}=486$ nm, $n_{mid}=588$ nm, and $n_{long}=656$ nm. FIG. 6C shows the partial dispersion $P_{long}=(n_{mid}-n_{long})(n_{short}-n_{long})$ plotted as a function of the Abbe number. The partial dispersion shows the relative weight of the optical dispersion that is accrued after the mid wavelength.

Figures 7A, 7B:
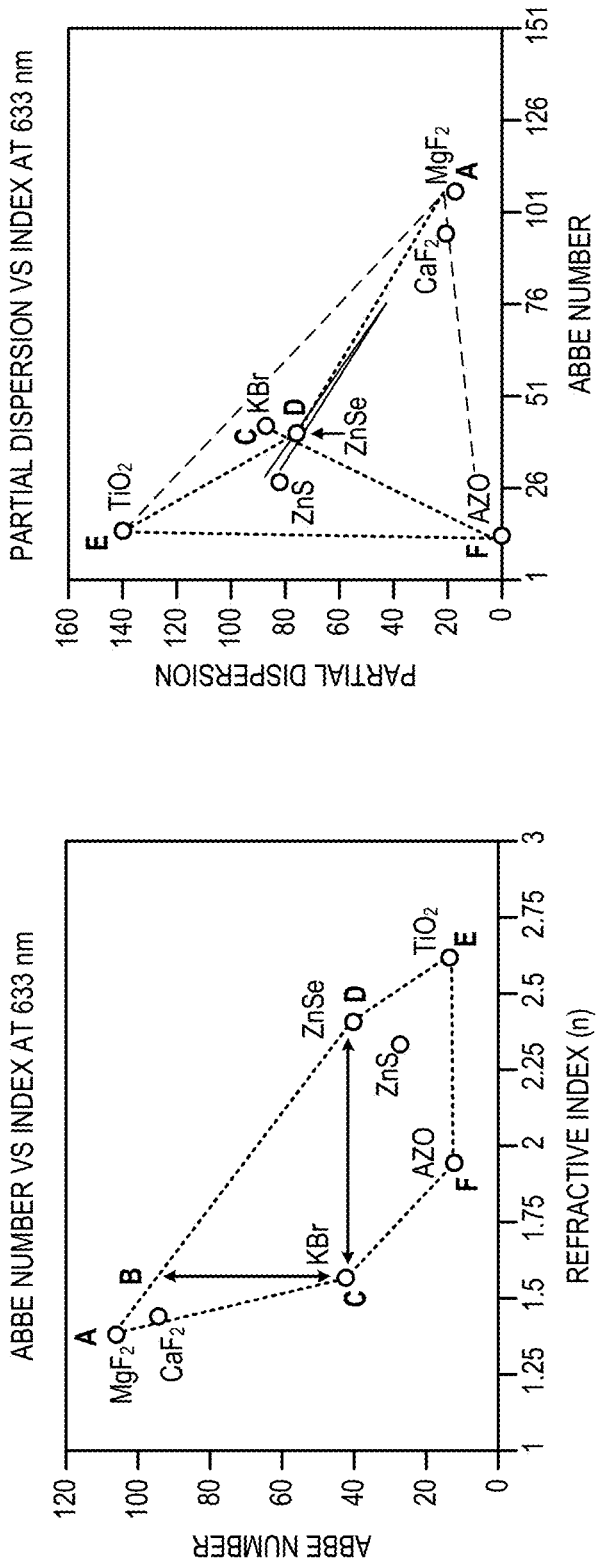
FIGS. 7A and 7B show aspects of example nanomaterials.

FIGS. 7A and 7B show aspects of example nanomaterials. In particular, FIG. 7A is a plot of Abbe Number versus refractive index for selected materials in the visible. The end points are 100% concentrations of the material. The dashed lined represents binary mixes of two materials. The solid lines show ternary and quaternary mixes of materials can be used to create materials with specific index and dispersion properties. More particularly, the solid, vertical line represent compositions with the same refractive index value and different Abbe Numbers; the solid, horizontal line shows material compositions that have variable index value with a constant Abbe Number. FIG. 7B is a plot of partial dispersion plotted against refractive index. The mixtures shown on left have partial dispersion values. These plots show that with the optical inks labelled A, C, F, E, and D, it is possible to deposit the inks in specific ratios to create optical elements that have a refractive index and Abbe number that is anywhere within a polygon formed by vertexes that correspond to the optical inks. As can be seen by the solid lines, it is possible to create a range of optical materials with the same refractive index with different dispersion values. For example, as shown in the vertical line connecting C (KBr) intercepting B [a mix of A ($MgF_2$) and D (ZnSe)], it is possible create refractive index materials with a constant refractive index value 1.565 with Abbe number values that range from 42.5 to 92 (the intercept at the mix of A and C). It is also possible to create a material with a constant Abbe number with a range of refractive index values. For example the line originating at C (KBr) and extending horizontally, has a constant Abbe number of 42.5. It intercepts the line representing the mix of materials D (ZnSe) and A ($MgF_2$) at a mix value that has a small $MgF_2$ composition. The Abbe number of ZnSe is 41.07, so a minor amount of $MgF_2$ reduces the dispersion.

It can also be seen that using materials F (AZO), D (ZnSe) and E ($TiO_2$), it is possible to mix the three materials in specific ratios such that the properties of ZnS are achieved. FIG. 7B shows the partial dispersion values that are achieved with the materials. This approach can also be used to create optical elements in the form of GRIN lenses.

Figure 8A:
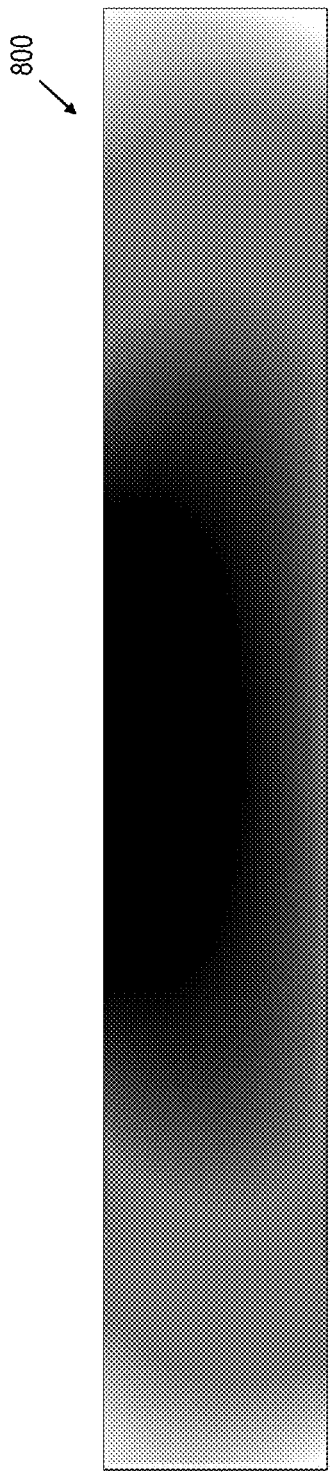
FIGS. 8A, 8B, and 8C show aspects of an example gradient-index lens having a refractive-index gradient in three dimensions.
Figure 8B:
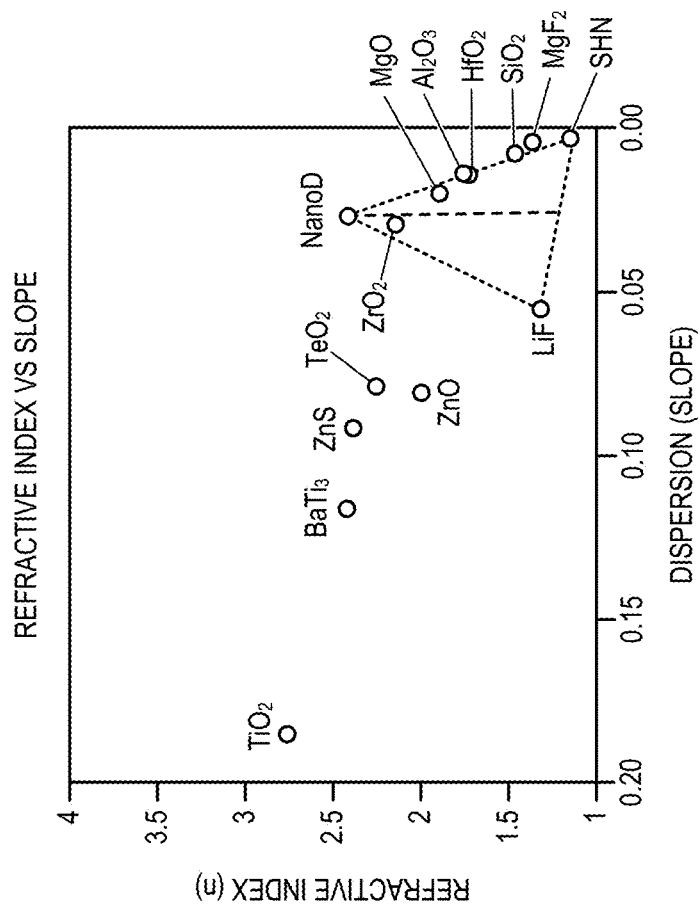
Figure 8C:
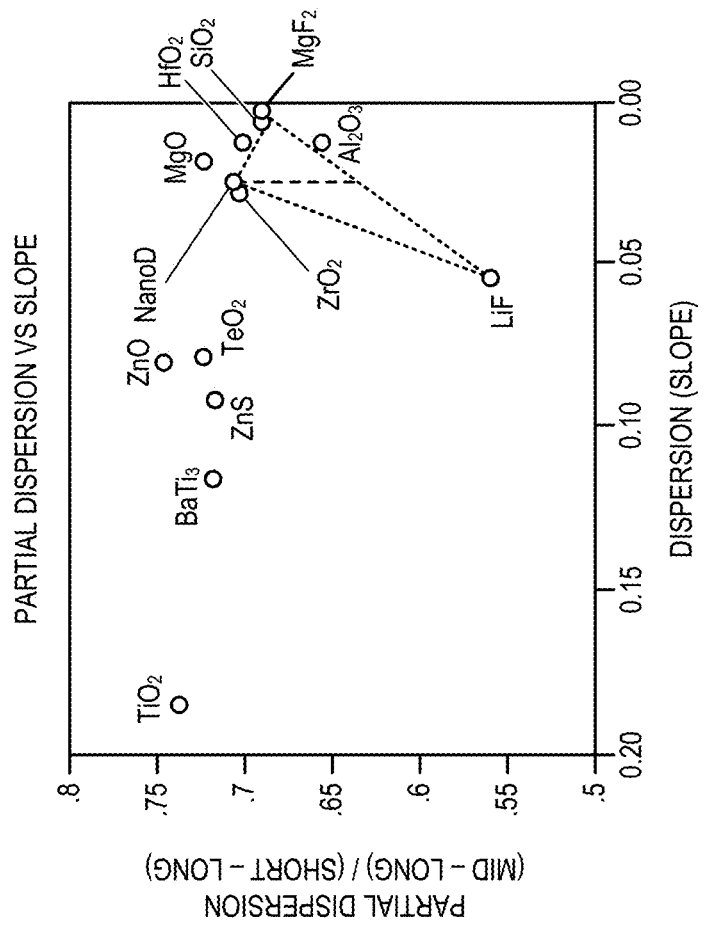

FIGS. 8A, 8B, and 8C show aspects of an example gradient-index lens 800, as an example optical element, having a refractive-index gradient in three dimensions. In this example, the dark regions are the high index regions and the light regions are the low index regions. More particularly, lens 800 of FIG. 8A shows a three-dimensional, radially symmetric GRIN lens. The dark region is the highest index, and the light is the lowest index; the radial index distributions change as a function of the axis.

FIG. 8B shows a map of refractive index at 588 nm versus the slope of the refractive index (486 nm to 656 nm) for various materials. The points are provided at 100% compositions. The dashed lines between points represent examples of variable mixes of two materials. The vertical line shows an achromatic mix, wherein the GRIN lens is comprised of a blend of nanodiamond, and an LiF silicon hollow nanosphere (SHN). Because the slopes of the dispersion (slope) are constant, the lens comprised of materials from the vertical line is achromatic.

FIG. 8C shows a map of the partial dispersion versus the dispersion. The vertical, dashed line shows that for the achromatic solution, the higher index part of the lens (in the middle of lens 800 of FIG. 8A) has more optical power at the shorter wavelengths than at longer wavelengths.

FIG. 8B further shows how an achromatic GRIN lens may be fabricated using three materials. In this example, Nanodiamond, LiF, and silicon hollow nanospheres (SHN) are combined. Using an optical ink comprised of the Nanodiamond, as the high index material, and a mix of SHN and LiF, which has the same dispersion as LiF, it is possible to create a GRIN lens using a binary mix of optical ink materials, ranging from 100% Nanodiamond and 0% (LiF/SHN) and 0% Nanodiamond and 100% (LiF/SHN). Because the dispersion is constant for all mixes, the dispersion is the same, such that all wavelengths experience the same optical power, and the lens is achromatic. FIG. 8C shows the partial dispersion values of these materials.

Figure 9A:
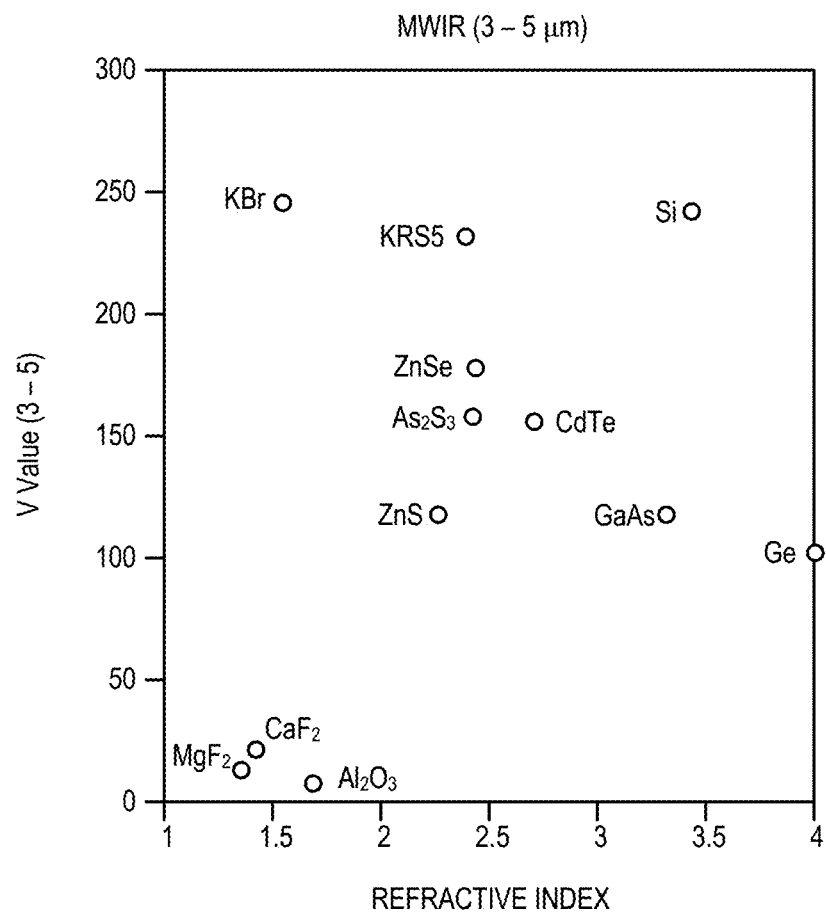
FIGS. 9A and 9B show optical properties of example materials in the MWIR and LWIR wavelength range.
Figure 9B:
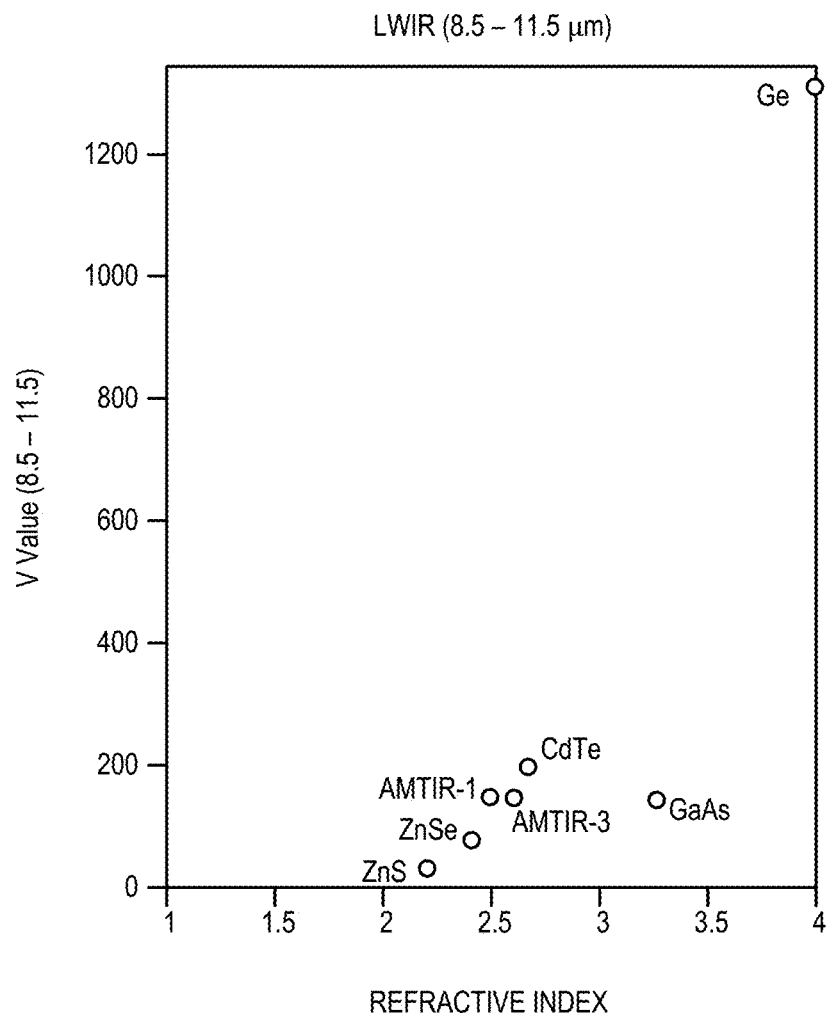

FIGS. 9A and 9B show aspects of example optical properties of selected materials in the MWIR and LWIR wavelength range. These plots illustrate the Abbe number of various optical materials plotted against index for the indicated spectral ranges. Together FIGS. 9A and 9B illustrate a similar example for common materials in the mid-wavelength infrared, shown in FIG. 9A, and the long-wavelength infrared, shown in FIG. 9B.

Figure 10:
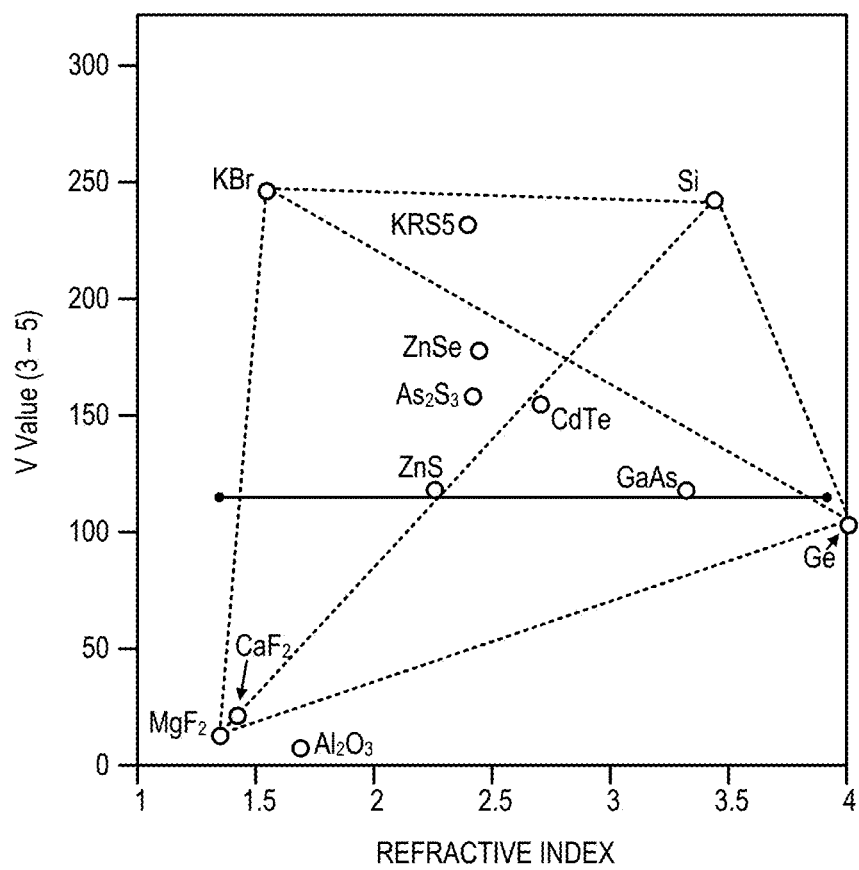
FIG. 10 shows aspects of an example method for creating MWIR materials with specific refractive index and dispersion values.

FIG. 10 shows aspects of an example method for creating MWIR materials with specific refractive index and dispersion values. This drawing shows how materials anywhere within the polygon formed by vertexes that correspond to the materials can be created using the specific mix ratio. The Abbe number of various optical material mixes are plotted against index for the spectral ranges indicated. The end points are single materials, the dashed lines connecting endpoints can be obtained by binary mixes. Points within the polygon can be created using ternary and quaternary material compositions. The horizontal line is representative of a potential gradient index lens, in which the Abbe number is constant for all index values. For example, glass ceramics with the properties of ZnS can be obtained using mixes of KBr, $MgF_2$, and Ge. It is also possible to formulate optical inks that represent the endpoints of the blue line (a mix of KBr and $MgF_2$) and a mix of (Ge and KBr).

Optics is the branch of physics that deals with the behavior and properties of light and its interaction with matter. Optics is used extensively in manipulating EM photons or wavelengths to control their properties and behavior. This can be achieved using a variety of optical components such as lenses, mirrors, filters, and diffractive elements. By carefully selecting and optimizing the optical components, the behavior of light can be precisely controlled to achieve specific goals.

The range of EM radiation includes radio waves, microwaves, infrared radiation, visible light, ultraviolet radiation, X-rays, and gamma rays. One way optics can manipulate EM photons is through focusing and collimating. Lenses can be used to focus light onto a specific point or to collimate light to make it parallel. The shape and curvature of the lens determines the focal length and can be optimized for specific wavelengths or applications.

Mirrors are another optical component used for manipulating EM photons. Mirrors can reflect light, change the direction of the light, or even amplify the light through optical resonators. Optical resonators are made up of mirrors placed at either end of a cavity and can be used to create lasers or other light sources.

Filters are used to selectively transmit or block certain wavelengths of light. Filters can be made from materials that absorb or reflect specific wavelengths or from diffractive elements that can selectively diffract light. This is useful for isolating specific wavelengths or creating bandpass filters for optical communication or sensing applications.

Diffractive elements, such as gratings and holograms, can also be used to manipulate EM photons. Gratings can be used to separate different wavelengths of light or to diffract light in specific directions. Holograms can be used to create three-dimensional images or to manipulate the phase of the light for beam shaping or focusing.

Optical materials are used in the visible spectral range for various applications, including optics, lenses, mirrors, and prisms. Glass is a popular choice for these applications due to its excellent optical properties, including high transmission and low dispersion. The process of making glass optical materials involves several steps and uses high-quality feedstock and precise furnace temperature control.

The feedstock for glass optical materials typically comprises high-purity raw materials such as silica, boron oxide, and other metal oxides. These raw materials are mixed and melted in a high-temperature furnace, usually made of platinum or other refractory metals. The temperature in the furnace is precisely controlled to ensure the glass is of the desired composition and purity.

Purity is a factor in determining the optical properties of an optical glass. Even small impurities can significantly affect the refractive index, absorption coefficient, and other properties that affect the performance of the glass in optical applications. The spectral properties of the glass are defined by measuring its transmission and absorption spectra over a range of wavelengths.

Different types of optical glass materials are designed to meet specific performance requirements for various applications. The glass is selected based on properties such as the coefficient of thermal expansion (CTE), Abbe number, and refractive index. The CTE determines how the glass will respond to temperature changes, which is important for applications that require precise optical alignment. The Abbe number is a measure of the dispersion of a glass, which affects its ability to focus poly-chromatic light accurately.

There are many different optical glass materials because different applications dictate different combinations of properties. For example, some applications dictate low dispersion, while others dictate high transmission over specific wavelength ranges. The development of new optical glass materials continues to evolve to meet the demands of new applications and technologies.

Optical materials for the infrared (IR) spectral range are important components in a wide range of applications, including thermal imaging, remote sensing, and spectroscopy. IR optics use unique materials due to the specific properties of the IR wavelength range, which is longer than the visible wavelength range.

IR optics are typically made from a variety of materials, including crystalline materials, chalcogenides, and glasses. Germanium, zinc selenide, and silicon are commonly used materials for IR optics due to their high IR transmittance and low absorption coefficients. Crystalline materials, such as sapphire and calcium fluoride, also have high IR transmittance but can be expensive and challenging to manufacture.

The process of manufacturing IR optics dictates high-quality raw materials and advanced manufacturing techniques. The raw materials are carefully selected and processed to achieve the desired purity and homogeneity, as even small impurities can significantly affect the optical properties of the material.

The manufacturing process for IR optics typically involves several steps, including cutting, grinding, polishing, and coating. Advanced manufacturing techniques, such as diamond turning, are often used to produce complex shapes and surfaces with high precision.

Terahertz optical devices use materials that are transparent to electromagnetic radiation in the terahertz frequency range (approximately 0.1-10 THz) and have other desirable properties such as high refractive index, low absorption, and high mechanical strength. Materials commonly used for terahertz optical devices include GaAs, Si, ZnS, quartz, and $LiNbO_3$.

X-ray optical materials are components in many X-ray applications, including medical imaging, material science, and X-ray astronomy. X-ray optics are commonly made using advanced manufacturing techniques such as diamond turning and lithography. High-quality materials with low absorption coefficients and high purity are used to achieve the desired optical properties. One of the most commonly used materials for X-ray optics is silicon. Silicon has excellent X-ray transmission properties and is relatively easy to process using standard semiconductor manufacturing techniques. Diamond is another material that is gaining popularity for X-ray optics due to its high mechanical stability and excellent X-ray transmission properties. Other materials, such as lithium fluoride, beryllium, and glass, are also used for X-ray optics. Lithium fluoride has high X-ray transmission properties, low absorption, and a wide range of transmission wavelengths. Beryllium is lightweight and has excellent X-ray transparency in the low-energy X-ray region.

Fabricating optical components for specific applications within the electro-magnetic spectrum, including the x-ray, ultra-violet, visible presents a challenge because ideally the materials should precisely match the complex dielectric properties corresponding to the application over a wide spectral range.

The spectral-dielectric properties of RF devices, such as gradient index (GRIN) lenses, free-space impedance matching, substrates, and other devices, dictate precise permittivity and permeability values because these properties determine how electromagnetic waves interact with the devices. The permittivity and permeability of a material are related to its refractive index, which is a measure of how much light slows down as it passes through the material. In the RF range, permittivity and permeability are complex quantities that depend on frequency, and they affect the propagation of electromagnetic waves through the material. For example, in GRIN lenses, the permittivity and permeability of the material used for the lens affect how much the light is bent as it passes through the lens, which determines the lens's focal length and other optical properties. Similarly, in free-space impedance matching, the permittivity and permeability of the substrate material determine how efficiently the electromagnetic waves are coupled into the device.

The complex dielectric properties are parameters that affect the behavior of EM waves passing through a material. These parameters are typically determined by the composition of the material. The limitations of existing optical materials stem from the limited degrees of freedom available for designing optical elements due to the limitation of a homogeneous index and dispersion. Homogeneous refers to a material or medium that has the same properties, such as refractive index, throughout its volume. For a homogeneous refractive index, this means that the speed at which light travels through the material is constant for a given wavelength, and the material behaves the same way for all colors of light at that wavelength.

The homogeneous-index elements used in traditional optics have limited degrees of freedom (DOF). With existing optical materials, optical power is produced only at the surfaces of the element, resulting in geometric and chromatic aberrations that use multiple elements with differing dispersion properties to correct. The current optical materials used in manufacturing have homogeneous index have limited ability to correct for primary and partial dispersion, leading to chromatic aberrations. Even then, complete correction of chromatic aberrations, combined with higher resolution and wider fields of view, requires a significant number of additional lenses, resulting in a larger and more expensive system. Advanced options like conic and aspheric surfaces are available for optical systems, but they demand more intricate surface fabrication and metrology. They also require very price opto-mechanical alignment and stabilization. As a result, the size, weight, and cost of the optical system balloons.

The effective medium theory is a method used to describe the optical properties of composite materials, where the material properties are averaged over the volume of the material. The effective medium theory is useful in modeling the optical properties of composite materials, where the optical behavior of the material is influenced by the distribution and properties of its constituent parts.

An example EMT formula for nanocomposites is the Maxwell-Garnett formula, which assumes that the composite material comprises a homogeneous matrix with embedded spherical nanoparticles. The refractive index of the composite is calculated as:

$$n\_com = n\_mat * (1 + f * (n\_np^2 - n\_mat^2)/n\_np^2 + 2 * n\_mat^2))$$

where n_com is the refractive index of the composite material, n_mat is the refractive index of the matrix material, n_np is the refractive index of the nanoparticle, and f is the volume fraction of the nanoparticles.

Another EMT formula for nanocomposites is the Bruggeman formula, which assumes that the composite material comprises a homogeneous mixture of matrix and nanoparticle materials. The refractive index of the composite is calculated as:

$$n\_com^2 = f * n\_np^2 + (1 - f) * n\_mat^2 + \\ (3 * f * (1 - f) * (n\_np^2 - n\_mat^2)^2)/[(2 * f * n\_np^2 + \\ (1 - f) * n\_mat^2) * (2 * (1 - f) * n\_mat^2 + f * n\_np^2)]$$

where n_com is the refractive index of the composite material, n_mat is the refractive index of the matrix material, n_np is the refractive index of the nanoparticle, and f is the volume fraction of the nanoparticles.

Other EMT formulas, such as the Lorentz-Lorenz formula and the Rayleigh-Debye-Gans formula, can also be used to model the optical properties of nanocomposites for optics, depending on the specific properties of the composite material and the desired level of accuracy.

The effective medium theory assumes that the material is homogeneous, meaning that it has the same index throughout its volume. In general, a medium is considered to be transparent and non-scattering if the size of its components is significantly smaller than the wavelength of the light passing through it. This scattering can be either elastic or inelastic, depending on the energy of the light and the nature of the components. The exact size to avoid scattering depends on the properties of the medium and the wavelength of light. For example, if may be sufficient to define the largest compositional element to be sized no larger than $\lambda/10$, where $\lambda$ is the incident EM wavelength.

Dispersion refers to the way that different wavelengths of light are refracted, or bent, by different amounts as they pass through a medium such as glass or air. Materials with constant dispersion have limited design flexibility, as their dispersion properties cannot be tailored to specific applications. Partial dispersion refers to the fact that a material's dispersion properties may not be constant across all wavelengths but can change gradually with increasing wavelength. This can make it difficult to achieve precise control over the dispersion properties of optical elements and can limit their performance in certain applications.

For example, for polychromatic visible optical applications, the refractive index spectrum is optimized over the intended spectral range of operation, so that the performance of the optical element may be specified for each wavelength of incident light. For imaging applications, the requirement may be that all wavelengths should focus to a common focal point, such that chromatic aberrations are eliminated.

Chromatic aberration is a type of optical aberration that occurs when different wavelengths of light are refracted differently by an optical element, such as a lens. Chromatic aberration is caused by the homogeneous refractive index within a lens, which means that the refractive index is the same for all wavelengths of light. When light passes through a lens with a homogeneous refractive index, it is refracted, or bent, by an amount that depends on the refractive index of the lens. However, different wavelengths of light have different refractive indices, which means that they are refracted differently as they pass through the lens. This results in chromatic aberration, where different wavelengths of light are focused at different points, causing a blurry or distorted image.

The amount of chromatic aberration depends on the material properties of the lens, as well as the curvature and thickness of the lens. Materials with a higher refractive index, such as glass, tend to have higher amounts of chromatic aberration than materials with lower refractive indices, such as plastics. To correct chromatic aberrations, lens designers use multiple lenses or materials with anomalous dispersion to reduce chromatic aberration and improve the performance of optical systems.

In contrast to imaging, for spectroscopic applications, dispersion is used to separate the different colors of light. If the dispersion is not well controlled, the different colors of light can become smeared out or distorted, making it difficult to accurately measure the spectrum. Without the ability to ability to independently control refractive index and dispersion, it is not possible for the wavelengths to be separated on-axis and for the individual colors of the light to be linearly separated and to be precisely located with equal optical power on a flat focal plane.

Lenses with non-uniform refractive indices, such as gradient-index lenses, can provide uncommon optical properties that are difficult to achieve with homogeneous materials. Three-dimensional gradient index optics offer several benefits due to the degrees of freedom they provide. Three-dimensional index gradients can be tailored to produce complex and precise optical effects, leading to the creation of new and innovative optical devices. Unlike traditional optics, three-dimensional gradient index optics have additional degrees of freedom by virtue of their three-dimensional index gradients, i.e., $n(x,y,z)$ within their bulk. This allows for the creation of refractive freeform lenses with reduced geometric and chromatic aberrations, enabling more compact and lightweight optical systems to be made with fewer optical elements.

The ability to create optical materials with precise refractive index spectra and primary and secondary dispersion properties that can be combined in a single element would offer a significant improvement over traditional homogeneous-index optics and GRIN optics.

Inkjet print (IJP) additive manufacturing, with multiple printheads, provides a flexible means for fabricating elements. The use of multiple printheads allows for the controlled deposition of primary optical inks in varying ratios to create optical materials with highly tailored and consistent optical properties, including refractive index, dispersion, and partial dispersion. Interdiffusion of the constituents during deposition allows the nanoparticles to be homogeneously distributed throughout the material. With the spatiotemporal patterning available with inkjet print (IJP) additive manufacturing, it is also possible to form compositional gradients with subwavelength accuracy. The use of multiple printheads enables the creation of composite blends of multiple nanoparticles that define the optical properties in each voxel, leading to a highly precise and controlled mixing process at the sub-wavelength scales to avoid scattering, as can be predicted using the effective medium theory.

Nanoparticles can be used to compose materials with precise optical properties. By controlling the volume fraction and refractive index of each type of nanoparticle, it is possible to tailor the optical properties of the composite material to meet specific requirements. Effective medium theory provides a framework for describing the optical properties of a composite material made up of nanoparticles with different refractive index spectra. When nanoparticles are dispersed in a medium, the resulting material exhibits an effective refractive index that is a function of the volume fraction of the nanoparticles and their individual refractive indices. The effective medium theory takes into account the interactions between the nanoparticles.

By controlling the volume fraction of each type of nanoparticle and their individual refractive indices, it is possible to tailor the effective refractive index of the composite material. This allows for the creation of materials with specific refractive index values, dispersion, and partial dispersion properties. Additionally, by controlling the volume fraction of nanoparticles with different refractive index spectra, it is possible to tailor the dispersion properties of the material, including the partial dispersion and the chromatic aberration.

There are many different methods for creating nanoparticles, each with its own advantages and limitations, depending on the specific application requirements. Example methods for creating nanoparticles include: Chemical reduction: This involves reducing metal ions to their corresponding nanoparticles using a reducing agent; Physical vapor deposition: This involves the deposition of atoms or molecules onto a substrate using a physical vapor source, such as sputtering, thermal evaporation, or pulsed laser deposition; Chemical vapor deposition: This involves the deposition of a thin film or nanoparticles on a substrate by chemical reactions in the gas phase; Sol-gel synthesis: This involves the use of a sol-gel process to create a colloidal suspension of nanoparticles in a liquid, which can be further processed to create a solid material; Electrochemical synthesis: This involves using an electrochemical cell to synthesize nanoparticles by controlling the electrodeposition of metal ions onto a substrate; Hydrothermal synthesis: This involves using high-pressure and high-temperature conditions to promote the nucleation and growth of nanoparticles in a liquid medium; Ball milling: This involves the use of high-energy ball milling to grind bulk materials into fine powders, which can then be further processed to create nanoparticles; Microfluidic synthesis: This involves using microfluidic devices to control the reaction conditions and produce nanoparticles with a high degree of control over size and morphology.

Ball-milling is an example of a 'top-down' synthesis method. Using this method, for example, glass materials may be ground and milled to the sub-wavelength scale desired to be combined inkjet printable optical inks.

In the visible and infrared spectral ranges, materials may be selected based on their refractive index, dispersion, and partial dispersion values. The refractive index and dispersion properties of example optical materials are shown in the table of FIG. 11.

One of more of the materials of the table of FIG. 11 can be used to create a variety of nanoparticle types including core-only, hollow core, core-shell, core-multi-shell architectures, wherein, to the first order, the properties of the materials can be predicted based on the volumetric composition.

Chemical ligands can be used to stabilize nanoparticles in solution, prevent aggregation, and control the surface chemistry of the nanoparticles. When inkjet printing is used to deposit nanoparticles, the ligands can help to control the deposition process and improve the quality of the printed features.

While both organic and inorganic ligands may be used, to inorganic ligands may be preferred for many applications, Inorganic ligands used in nanoparticle solutions for inkjet printing can include molecules such as halides (e.g. chloride, bromide), amines, carboxylic acids, and thiols. These ligands can be used to stabilize the nanoparticles in solution and control their size and shape, as well as to tailor their surface chemistry and reactivity for specific applications.

In concert with the ligand shells, Self-assembled monolayers (SAMs) can be used to control the assembly of nanoparticles on a surface and to modify their properties, which is important for the development of nanocomposite materials with tailored properties for specific applications.

Self-assembled monolayers (SAMs) are thin organic layers formed by the spontaneous assembly of organic molecules on a surface. SAMs can also be used as inorganic ligands to aid in the assembly of nanocomposite materials. Some examples of SAMs inorganic ligands are:

Thiols: Thiols are sulfur-containing organic molecules that can form SAMs on gold and silver surfaces. They can be used to control the assembly of nanoparticles on the surface and to modify their properties.

Silanes: Silanes are silicon-containing organic molecules that can form SAMs on silicon and other oxide surfaces. They can be used to control the wettability and adhesion of the surface and to provide chemical functionalities for further modification.

Phosphonic acids: Phosphonic acids are organic molecules that can form SAMs on metal oxide surfaces such as aluminum, titanium, and zirconium oxide. They can be used to control the surface properties and to provide chemical functionalities for further modification.

Carboxylic acids: Carboxylic acids are organic molecules that can form SAMs on metal and metal oxide surfaces. They can be used to control the surface properties and to provide chemical functionalities for further modification.

The ligand shells can also be used to optimize the rheological properties of the optical inks to assist in their inkjet print deposition. The printed nanoparticle suspensions may be composed of 50% (volume) of more nanoparticles. limited by the ability of the printheads to reliably deposit the materials.

The rheological properties for reliable inkjet printing of deposit materials depend on several variables. These variables include the material properties of the deposit, such as viscosity, surface tension, and particle size distribution, as well as the properties of the printing system, such as nozzle size, droplet velocity, and frequency. A suitable ink for inkjet printing can have a low viscosity to allow for easy flow through the nozzle, while also having a high surface tension to prevent the ink from spreading too much upon deposition. Additionally, the ink can have a narrow particle size distribution to prevent clogging of the nozzle and ensure consistent droplet formation. The rheological properties can be optimized through the use of additives or adjustments to the ink composition to ensure reliable inkjet printing of deposit materials.

Some of the key variables include:

Viscosity: The viscosity of the ink is an important factor in determining the ability of the ink to flow through the print head and be deposited onto the substrate. Inks that are too viscous may clog the print head, while inks that are too thin may spread out too much on the substrate.

Surface tension: The surface tension of the ink affects the way that the ink spreads out on the substrate. Inks with high surface tension tend to bead up, while inks with low surface tension tend to spread out more evenly.

Yield stress: The yield stress of the ink is the stress required to initiate flow. Inks with high yield stress may not flow easily through the print head, while inks with low yield stress may flow too easily and spread out too much on the substrate.

Shear thinning behavior: Shear thinning behavior is the tendency of the ink to decrease in viscosity as it is subjected to shear stress. Inks with shear thinning behavior tend to flow more easily through the print head and deposit more uniformly on the substrate.

Thixotropy: Thixotropy is the tendency of the ink to decrease in viscosity over time when it is subjected to shear stress. Inks with thixotropic behavior tend to flow more easily through the print head and deposit more uniformly on the substrate over time.

Particle size and distribution: The size and distribution of particles in the ink can affect the rheological properties of the ink. Inks with large particles may be more difficult to flow through the print head and may produce uneven deposits on the substrate.

The rheological properties of deposit materials used in inkjet printing can be characterized by several metrics, such as the Reynolds number, Ohnsberger number, Deborah number, and Weissenberg number. The Reynolds number is a dimensionless metric that characterizes the ratio of inertial forces to viscous forces and indicates the tendency of the fluid to transition from laminar to turbulent flow. The Ohnsberger number is another dimensionless metric that characterizes the elasticity of the fluid and is defined as the ratio of the elastic forces to viscous forces. The Deborah number characterizes the ratio of the characteristic time scale of the fluid to the characteristic time scale of the deformation and indicates the tendency of the fluid to exhibit viscoelastic behavior. The Weissenberg number characterizes the magnitude of the shear-induced stresses in the fluid and indicates the tendency of the fluid to exhibit nonlinear viscoelastic behavior. By characterizing the rheological properties of deposit materials using these metrics, inkjet printing can be optimized for reliable and accurate deposition of materials.

Many small-drop-volume piezo-electric printheads use low temperature deposition of materials that have a viscosity of 20 cPoise, or less. There are some small-drop-volume industrial piezo-electric printheads that can accommodate 100 cPoise, or more. Raising the temperature of the optical ink can be used to increase the allowable viscosity, as allowable by the specific materials used.

The digital printing concept using a voxel-based representation enables digital material composition to be fabricated by AM processes. That is, an object can be decomposed into many assembled voxels, and a multi-material AM machine can be used to control the deposition of limited types of base materials in the voxel domain. The deposited material in each voxel is homogeneous instead of continuously varying. Directly using the available digital materials to compute the material composition with desired material properties is an optimization problem, in which the material variables in the design domain are discrete integers. The optimization of material composition is an integer programming problem, which is known to be NP-hard. Even with a limited number of based materials (e.g., 2-4), the design space of the digital material composition defined on voxels is extremely large. For example, for a simple cubic model represented by 100×100×100 voxels and only two base materials, there would be 21E+06 of possible combinations that need to be considered. Hence, for a given design requirement, how to optimize digital material composition is very challenging due to the extremely large design space that is discrete.

The materials can be deposited using bitmap patterns. To quantize a continuous gradient property optical device that can be printed using a limited number of materials, it is desirable to use an error diffusion algorithm that converts the three-dimensional design to a stack of bitmaps that determine the time and location that the materials are deposited on the substrate. Error diffusion algorithms can be used to optimize the placement of each material using bitmaps created through error diffusion. The algorithm calculates the difference between the desired dielectric index profile and the dielectric index profile associated with the print map and distributes the error to adjacent pixels in a way that minimizes the overall error in the printed structure. There are different techniques for error diffusion, including directional error diffusion, depth-dependent error diffusion, gradient-rate or optical-power-driven error diffusion, or spatially adaptive error diffusion.

The error diffusion tool optimizes the placement of each material using bitmaps created through error diffusion. An error diffusion algorithm works by creating a series of build maps for each of a limited number of materials that allows for the device to be fabricated using additive manufacturing by defining the location that each material is deposited, for a set of manufacturing process conditions.

The error diffusion algorithm calculates the difference between the desired dielectric index profile and the dielectric index profile associated with the print map and distributes the error to adjacent pixels in a way that minimizes the overall error in the printed structure. By iteratively adjusting the Print Profile at each point, the algorithm can gradually reduce the error and improve the performance of the Fabricated Device relative to the intended performance of the 'Device Design'.

Each material used in fabricating GDP Optics may be described by its dielectric properties at each wavelength. These properties may include spectrally varying permeability, permittivity, refractive index, or loss. Polychromatic error diffusion can be performed directly, using a tabulated set of values for each wavelength, or can be optimized parametrically, for example by optimizing index, dispersion, and secondary dispersion concurrently. For refractive index spectra, in addition to index, dispersion, and partial dispersion, the complex wavelength dependence is sometime parameterized using the Cauchy and Sellmeier equations. These wavelength dependent properties may also be a function of temperature, and other external influences such as pressure, and may also be polarization dependent. Because $n(\lambda)=sqrt(\varepsilon(\lambda))$, where n is the index, and $\varepsilon$ is permittivity, parameterized polynomial models can be used to describe permittivity. Similarly, permeability and other properties can be described parametrically as a function of wavelength.

The representations, along with physical properties, such as may be included in a library, and may represent a 'Material Model', which is used by the software optimizer to determine the optimal material to be deposited within voxels of the three-dimensional design.

For an optimal bitmap to be obtained for each material, it can be desirable for the algorithm to have a model of the process (the 'Process Model'), so that the drop volume, the drop distance, the drop diffusion, the drop placement accuracy, and other process related parameters may be included in the optimization process. These process models also contribute to setting the voxel size.

Optimizing the performance of the three-dimensional HDP Optic design at multiple wavelengths concurrently, can be challenging, as these properties are often interdependent and can affect each other. An aspect of performing error diffusion for a three-dimensional GRIN optic is to manage the interaction between the different wavelengths and materials. This may involve adjusting the error diffusion parameters for each wavelength and material and can include techniques such as directional error diffusion, depth dependent, gradient-rate or optical-power-driven error diffusion, or spatially adaptive error diffusion.

Determining the optimal error diffusion algorithm for a specific gradient index optic design can be achieved with experimentation and evaluation of different algorithms. Some factors that can affect the choice of algorithm include the complexity of the gradient index profile, the desired accuracy of the final optic, and the limitations of the fabrication process. Performing optimization of three-dimensional error diffusion algorithms can be achieved through a variety of methods, including using reinforcement learning, genetic algorithms, gradient descent, or deep learning methods.

The inter-diffusion of constituents is one of the variables used to create the bitmaps used to deposit each material. The diffusion of constituents of optical materials after they are deposited is determined by several factors. These factors include the molecular weight of the constituents, the solvent used to deposit the material, and the temperature at which the material is deposited. In general, higher temperatures lead to faster diffusion of the constituents. The size and shape of the deposited structure can also affect the diffusion of the constituents, as well as the environment, such as the presence of other chemical species or SAM that can interact with the deposited material. Additionally, the chemical properties of the deposited material, such as its surface energy and the nature of the chemical bonds between its constituents, can also influence diffusion behavior. Understanding these factors can be important for optimizing the deposition and diffusion processes in order to create high-quality optical materials with desired properties.

Fickian diffusion is a type of diffusion that occurs in a homogeneous medium with a concentration gradient and is driven by the concentration difference. It is described by Fick's laws of diffusion, which relate the flux of particles to the concentration gradient and the diffusion coefficient. Fick's first law describes the flux of a component in the mixture, which is proportional to the concentration gradient of that component. The equation is given by $J=-D(dC/dx)$, where $J$ is the flux, $D$ is the diffusion coefficient, $C$ is the concentration, and $x$ is the position. Fick's second law describes the time-dependent diffusion of the components, given by $dC/dt=D(d^2C/dx^2)$. These equations can be used to model the diffusion of the constituents of optical materials and to predict the final refractive index profile of the deposited material. Additionally, other factors such as surface tension, viscosity, and chemical interactions can also affect the diffusion behavior of the constituents.

Wessmueller diffusion, on the other hand, is a type of diffusion that occurs in a heterogeneous medium, such as a composite material, where the diffusion coefficient may vary locally due to variations in the microstructure or composition. It is described by the Wessmueller equation, which is a modification of Fick's laws that includes an additional term to account for the local variations in the diffusion coefficient. This additional term can result in non-Fickian behavior, such as anomalous diffusion or sub-diffusion.

Wessmueller diffusion is a term used to describe the diffusion of nanoparticles in a fluid medium due to Brownian motion. It is related to the Einstein-Smoluchowski equation, which describes the random movement of particles in a fluid due to collisions with molecules in the fluid. The Wessmueller diffusion coefficient describes the rate at which particles diffuse in the fluid and is proportional to the product of the particle size and the Brownian motion coefficient. This type of diffusion can play a role in the inter-diffusion of nanoparticle composite optical inks after they are deposited.

Inorganic precursors can be deposited to create glass include metal alkoxides, metal chlorides, metal nitrates, and metal acetates. For example precursors may be deposited in the form of a sol-gel or spin-coating solution, which is then heated to form the glass. The choice of precursor can be selected based on the desired composition of the glass, the deposition method, and the processing conditions.

Sol-gels are a class of materials made by hydrolyzing metal alkoxides in solution to form a colloidal suspension or gel, which can then be deposited and processed to form a solid material. Sol-gel ink can be prepared by dispersing the sol-gel precursor materials in a suitable solvent and adding any desired stabilizing agents. The ink is then loaded into an inkjet printer, and droplets are deposited onto the substrate in a controlled pattern. The deposited sol-gel droplets can be annealed or treated to form a solid gel film on the substrate. Inkjet printing of sol-gels offers advantages such as precise control of droplet size and placement, which can result in improved resolution and uniformity of the deposited film.

Before drying the printed optical inks, there are several methods available to assemble the nanomaterials into a dense layer. One such method is ligand-mediated assembly, where chemical ligands are used to promote attractive forces between the nanoparticles and facilitate their assembly into a dense layer. Another method is convective or diffusive motion, where the ink is subjected to motion or a flow field to encourage the nanoparticles to pack more closely together. This can be achieved through various methods such as acoustic, magnetic, or electric fields. Additionally, the use of capillary forces or surface tension can be employed to drive the nanoparticles towards denser packing arrangements. Finally, the application of external pressure, such as with a stamp or roller, can also aid in compacting the printed material into a denser layer.

One method is to use external electric or magnetic fields to align the nanoparticles in a specific orientation, which can lead to increased density and improved properties of the deposited layer. Another method is to use surface tension effects to induce the self-assembly of nanoparticles into a dense and uniform layer. This can be achieved by using specially designed substrates or by manipulating the surface chemistry of the substrate or nanoparticles. Additionally, the use of shear forces or acoustic fields can also promote the assembly of nanoparticles into a dense layer.

The drying process can significantly affect the final properties of the deposited material, so careful control and optimization of the drying conditions is important for achieving the desired results. The best method for drying deposited optical inks depends on the specific ink composition. Methods for drying deposited inks include air drying, oven drying, and heat treatment. In at least some examples, the drying process can be performed slowly and at a low temperature to prevent cracking or deformation of the deposited material. In some cases, a combination of drying and annealing may be used to achieve the desired properties.

There are various agents that can be included in the optical ink to better control drying, such as surfactants, co-solvents, and viscosity modifiers. Surfactants can help to reduce surface tension and improve wetting of the substrate, allowing the ink to spread more uniformly and dry more evenly. Co-solvents can be added to adjust the drying rate and prevent the ink from drying too quickly or too slowly. Viscosity modifiers can help to control the rheological properties of the ink and improve its stability during printing and drying. Additionally, certain chelating agents can be used to control the kinetics of gelation or vitrification of the deposited materials, allowing for better control of the final properties of the printed material.

Optimization of drying can be used to preferentially shrink materials in the vertical out-of-plane direction. To avoid shrinking in-plane and ensure that the materials shrink only in the z-axis (e.g., the direction of layer stacking), several strategies can be employed. One approach is to use a surface treatment or a template that restricts the nanoparticle movement in the in-plane direction. This can be achieved by using a patterned substrate or a surfactant that promotes vertical alignment of the nanoparticles. Another strategy is to use a curing process that allows for the evaporation of the solvent and any organic components before the nanoparticles fuse and shrink. This can be achieved through controlled heating or irradiation, where the energy source penetrates the sample from the top and the bottom, ensuring that the shrinkage occurs only in the vertical direction. Additionally, adding a sacrificial layer beneath the printed material can also prevent in-plane shrinkage by providing a mechanical support to the deposited material during the drying process.

Ultraviolet or infrared drying can be particularly beneficial for avoiding lateral deformation, as they can quickly evaporate the solvent without excessive heating, minimizing in-plane shrinkage. Additionally, these drying methods can also help to promote interdiffusion of the inorganic components, resulting in a more homogeneous and stable material. Overall, selecting appropriate drying methods is desirable for producing high-quality, reliable optical materials using inkjet printing.

Materials that have low viscosity and can penetrate the nanoparticle network after drying can be used for enhancing and densifying the printed layer. Solvents such as ethanol, methanol, and isopropanol, for example, can be used to dissolve and penetrate the nanoparticle network, allowing for the diffusion of precursor species that can further react and form a denser layer. Other materials that can be used include low-molecular-weight molecules, surfactants, stabilizers, and chelating agents, which can also penetrate the nanoparticle network and assist in the densification process. The choice of material depends on the specific application and the desired properties of the final material.

After drying a layer of inkjet-printed optical inks, one can use inkjet printing to deposit dopants or other materials that can modify the EM, optical, mechanical, or electrical properties of the material. For example, one can deposit metallic or semiconductor nanoparticles to create plasmonic or photonic structures, or dopants that introduce impurities to modify the refractive index or the electronic properties of the material. Other possible dopants include organic dyes or fluorescent molecules that can modify the optical properties of the material, or materials that can create defects or alter the local structure of the material to modify its properties. The specific dopants that are used will depend on the desired properties of the final material and the compatibility of the dopants with the inkjet printing process and the precursor materials.

Various ions can be deposited using inkjet printing to alter the optical or EM properties of the underlying materials. For example, silver ions can be deposited to create plasmonic materials that have enhanced absorption and scattering of light in the visible and near-infrared spectral ranges. Rare earth ions, such as erbium, can be deposited to create materials with uncommon luminescence properties, such as up-conversion and down-conversion. Other ions, such as copper, gold, and iron, can also be deposited to create materials with uncommon optical and EM properties. Additionally, doping with metal oxide nanoparticles, such as zinc oxide or titanium dioxide, can alter the material's optical properties.

Sintering agents can be added to dried nanoparticle layers to promote annealing, which is the process of heating and cooling the material to improve its structural and functional properties.

The surface area of nanoparticles has an inverse relationship with their melting temperature. This is because as the size of the nanoparticles decreases, their surface area to volume ratio increases. This higher surface area means that a larger percentage of the atoms are located at the surface, which lowers the overall cohesive energy of the material. This allows for the melting point of nanoparticles to be 30% to 50% that of their bulk counterparts. As a result, nanoparticles typically have a lower melting temperature compared to their bulk counterparts. For example, the melting temperature of bulk ZnS is around 1700° C., while the melting temperature of ZnS nanoparticles with a diameter of 3-4 nm has been reported to be around 1100-1200° C.

Additionally, surface defects and impurities can also contribute to lower melting temperatures for nanoparticles.

Vitrification can be achieved using one or more of various methods such as rapid thermal annealing, laser annealing, and microwave annealing. Other methods include ion implantation and ion beam mixing. Rapid thermal annealing involves quickly heating the material to a high temperature and then rapidly cooling it, which can lead to the formation of a glassy state. Laser annealing uses a high-intensity laser to melt the material and then rapidly solidify it, while microwave annealing uses microwave radiation to heat the material. Ion implantation involves bombarding the material with ions to introduce defects and disorder, while ion beam mixing involves mixing two different materials using ion beams to create a glassy phase. A variety of materials may be fabricated using this method.

Glassy composites and glass-ceramic materials, created through controlled crystallization of a base glass, have an uncommon microstructure that includes both glassy and crystalline phases. These materials can be tailored for various applications by altering their composition and processing conditions. Non-oxide and oxide nanoparticles are used as constituents to modify the properties of glass-ceramic materials.

The choice between non-oxide and oxide nanoparticles for forming glass-ceramic materials depends on the desired properties and applications of the final product. Non-oxide nanoparticles provide better mechanical and thermal properties, while oxide nanoparticles offer improved chemical stability and biocompatibility. Non-oxide nanoparticles are based on elements other than oxygen and typically exhibit superior mechanical, electrical, magnetic, and optical properties. They can act as nucleating agents, influencing the crystallization kinetics, phase composition, and overall properties of the glass-ceramic material. These nanoparticles are suitable for high-performance applications that rely on excellent mechanical properties, thermal stability, and wear resistance. On the other hand, oxide nanoparticles are based on oxygen and metal ions and are known for their high chemical stability and biocompatibility. They can also serve as nucleating agents, but they generally have a stronger influence on the glass-ceramic structure. Oxide nanoparticles are more suitable for applications that rely on biocompatibility and chemical stability.

Designing a glass-ceramic material with a precise refractive index value and dispersion value relies on a careful selection and combination of constituents, including the base glass and nanoparticles. The refractive index and dispersion of a glass-ceramic material are mainly influenced by the composition and structure of both the glassy. Designing a glass-ceramic material composed entirely of nanoparticles relies on an understanding of the refractive index and dispersion properties of each constituent nanoparticle.

The overall refractive index spectra will be influenced by the individual contributions of each nanoparticle, as well as their interactions with each other and with the surrounding matrix. One common approach is to use the Maxwell-Garnett or Bruggeman effective medium theories, which calculate the effective refractive index of a composite material based on the volume fractions and refractive indices of the individual components.

The Maxwell-Garnett theory is suitable for composite materials where one component (the inclusions) is dispersed in small amounts within a continuous matrix of the other component (the host material). The effective refractive index (n_eff) is calculated using the following formula:

$$n\_eff^2 = n\_m^2 * (1 + 2*f*(n\_p^2 - n\_m^2)/(2*n\_p^2 + n\_m^2 - f*(n\_p^2 - n\_m^2)))$$

where n_m is the refractive index of the host material, n_p is the refractive index of the inclusions, and f is the volume fraction of the inclusions.

To calculate the composite refractive index at each wavelength, the refractive indices of the host material and inclusions as a function of wavelength can be considered. Sellmeier model and equations can be used for the individual materials to obtain these values. The Sellmeier model is an empirical equation that describes the relationship between the refractive index of a material and the wavelength of light. Then, plug these refractive indices and the volume fraction of the inclusions into the Maxwell-Garnett formula to obtain the effective refractive index at each wavelength.

The Bruggeman theory is more general than the Maxwell-Garnett theory and can be applied to composite materials with more than two components or with no clear distinction between the host material and inclusions. The Bruggeman equation is:

$$f\_1 * (n\_1^2 n\_eff^2)/(n\_1^2 + 2*n\_eff^2) + f\_2*(n\_2^2 - n\_eff^2)/(n\_2^2 + 2*n\_eff^2) = 0$$

where n_1 and n_2 are the refractive indices of the two components, f_1 and f_2 are their volume fractions (f_1+f_2=1), and n_eff is the effective refractive index of the composite.

To calculate the composite refractive index at each wavelength using the Bruggeman theory, the refractive indices of the individual components as a function of wavelength can be considered. The Sellmeier equations can be used for the individual materials to obtain these values. Then, solve the Bruggeman equation for the effective refractive index (n_eff) at each wavelength using a numerical method, such as the Newton-Raphson method.

To calculate the composite refractive index at each wavelength, the refractive indices of the host material and inclusions as a function of wavelength can be considered. The Sellmeier equations can be used for the individual materials to obtain these values. The refractive indices and the volume fraction of the inclusions can be used within the Maxwell-Garnett formula to obtain the effective refractive index at each wavelength.

These effective medium approximations can then be used with the Sellmeier model to predict the spectral refractive index, dispersion, and partial dispersion of the final glassy material.

In glassy materials, the coefficient of thermal expansion (CTE) plays an important role in determining the thermal compatibility between different constituents, such as nanoparticles and the surrounding matrix. The CTE mismatch can significantly impact the mechanical properties, thermal stability, and reliability of the composite material, particularly under temperature changes or thermal cycling. Minimizing the CTE mismatch can be desirable to avoid issues such as internal stresses, delamination or debonding, and reduced mechanical properties. The acceptable level of CTE mismatch depends on the specific application and desired properties. Generally, aiming for a CTE mismatch of less than 10-20% between the nanoparticles and the surrounding matrix can help minimize potential adverse effects. Careful consideration of the CTEs of both the nanoparticles and the matrix is important during the design and development of glassy materials to ensure compatibility and optimize the material's performance.

Several methods can be used for post-treatment, including grinding, which involves removing material from the surface using abrasive tools to achieve the desired shape and reduce surface roughness. Polishing is another process that further reduces surface roughness and achieves a smooth, specular surface, which is important for minimizing scattering and reflection losses in optical components. Diamond turning is a precision machining process that uses a diamond cutting tool to remove material from the surface, suitable for creating complex shapes and achieving high surface quality. Magnetorheological finishing (MRF) is a polishing technique that uses a magnetically-responsive fluid containing abrasive particles to remove material from the surface with high precision and is capable of correcting surface errors on the nanometer scale. Finally, after the surface can be shaped and polished, an anti-reflective (AR) coating can be applied to minimize reflection losses and increase light transmission. These post-treatment methods can be used individually or in combination, depending on the requirements of the vitrified material and the desired optical properties.

In conclusion, one aspect of this disclosure is directed to a method for making an optical element. The method comprises: (a) receiving in a printing device a plurality of liquids, each including a volatile solvent, wherein one or more of the liquids also includes a suspension of particles; (b) receiving in the printing device a plurality of print maps corresponding to the plurality of liquids, each print map defining a pattern of application of the corresponding liquid for a series of pre-sintered layers of the optical element; (c) for each pre-sintered layer, operating the printing device to: (i) deposit the plurality of liquids according to the patterns defined in the plurality of print maps for that pre-sintered layer, and (ii) dry the pre-sintered layer; and (d) sintering the series of pre-sintered layers to form a vitreous monolith comprising the optical element.

In some implementations of the above aspect, the one or more of the liquids comprise nanoparticles. In some implementations of the above aspect, depositing the plurality of liquids comprises depositing each from a different printhead of the printing device, and different liquids sprayed from different printheads are allowed to interdiffuse before drying. In some implementations of the above aspect, depositing the plurality of liquids comprises depositing in predetermined volumetric ratios, providing an optical element with a predetermined spectral-dielectric response. In some implementations of the above aspect, depositing the plurality of liquids comprises depositing in pre-determined volumetric ratios, providing an optical element with predetermined refractive-index and dispersion values. In some implementations of the above aspect, the series of pre-sintered layers, after interdiffusion and sintering, provide a gradient composition and corresponding gradient-dielectric properties along one or more axes. In some implementations of the above aspect, the gradient dielectric properties are not symmetric along any axis. In some implementations of the above aspect, the nanoparticles comprise metal, semiconductor, and/or metal materials. For instance, such nanoparticles may comprise one or more $MgF_2$, $CaF_2$, $TeO_2$, ZnO, Al-doped ZnO (AZO), ZnS, ZnSe, $TiO_2$, $BaTiO_3$, $ZrO_2$, $SiO_2$, Se, Ge, Se, $Y_2O_3$, $La_2O_3$, Au, Ag, configured in hollow-core, core-only, core-shell, or core-multi-shell architectures. In some implementations of the above aspect, the nanoparticles comprise one or more quantum-confined nanocrystals. For instance, such nanoparticles may comprise ZnO, ZnS, CdSe, CdTe, ZnS, Si, InP, $CuInS_2$, $CuInSe_2$, PbS, PbSe, or HgTe nanocrystals which are smaller than the Bohr radius of the nanoparticle material.

In some implementations of the above aspect, the nanoparticles comprise one or more of ferrites, hexaferrites, spinel ferrites, garnet ferrites, $AB_2O_4$ (where A and B are metal cations), $MFe_{12}O_{19}$ (where M is a metal cation), $Li_2Mn_4O_8$ (where Li and Mn occupy tetrahedral and octahedral sites, respectively), $AFe_2O_4$—$MFe_2O_4$ (where A is a divalent metal cation and M is a trivalent metal cation) cobalt, iron oxide, manganese oxide, copper oxide, carbonaceous materials, graphite, graphene, carbon black, carbon nanotubes, $Fe_2O_3$, $Fe_3O_4$, MnO, $Mn_2O_3$, $Mn_3O_4$, CuO, $Cu_2O$, $MgAl_2O_4$, $ZnAl_2O_4$, $Fe_3O_4$, $BaFe_{12}O_{19}$, $SrFe_{12}O_{19}$, $CoFe_2O_4$, $NiFe_2O_4$, which may be configured in different aspect ratios.

In some implementations of the above aspect, the method further comprises poling in which an electric field and/or magnetic field is applied to the pre-sintered layer. Poling of the pre-sintered layer can be used to induce or enhance the piezoelectric properties of certain types of materials, such as ferroelectric ceramics and polymers. Poling involves aligning the electric dipoles or magnetic dipoles within the material by applying an electric field and/or magnetic field at elevated temperatures. The material can be heated to a specific temperature where its internal structure becomes more flexible, allowing the dipoles to align more easily. This temperature can be near the Curie temperature for ceramics, where the material transitions between ferroelectric and paraelectric phases. While the material is at this elevated temperature, an electric field and/or a magnetic field can be applied. The applied field aligns the dipoles within the material along the direction of the field. The material is then cooled while maintaining the field. As the material cools, the material retains the alignment of the dipoles. Poling can be performed magnetically in certain types of materials, particularly materials that exhibit magnetostrictive properties. Poling of the pre-sintered layer can be performed prior to or as part of the drying process, and prior to completion of sintering and vitrification of the layer.

In some implementations of the above aspect, the nanoparticles include glass nanoparticles. For instance, such nanoparticles may include one or more of chalcogenide glass, borosilicate glass, phosphate glass, zirconia glass, fluorinated glass, aluminosilicate glass, lithium disilicate glass, crown glass, flint glass, or fused silica. In some implementations of the above aspect, the viscosity of each of the plurality of liquids is below 100 cPoise. In some implementations of the above aspect, depositing the plurality of liquids comprises depositing a plurality of droplets having a drop volume less than 25 pL. In some implementations of the above aspect, the method further comprises operating the printing device to form a border usable as a reservoir to contain the plurality of liquids of at least one of the pre-sintered layers. In some implementations of the above aspect, drying the pre-sintered layer comprises UV or IR photonic curing and/or drying. In some implementations of the above aspect, drying the pre-sintered layer comprises drying via radio-frequency, microwave, or millimeter-wave radiation, at least in part. In some implementations of the above aspect, the method further comprises doping at least one dried, pre-sintered layer via: (a) operation of the printing device, (b) atomic-layer deposition, (c) chemical-vapor deposition, and/or (d) solution-based doping. In some implementations of the above aspect, sintering the series of pre-sintered layers comprises sintering via a laser or other photonic source. In some implementations of the above aspect, the method further comprises partially vitrifying at least one dried, pre-sintered layer before application of a subsequent layer. In some implementations of the above aspect, depositing the plurality of liquids comprises depositing onto a pre-existing optical device. In some implementations of the above aspect, the plurality of liquids comprises a plurality of solutes; here, adjacently deposited solutes have coefficients of thermal expansion within 20% of each other. In some implementations of the above aspect, sintering the series of pre-sintered layers comprises chemical sintering, to densify the optical element before final vitrification. In some implementations of the above aspect, the printing device comprises an inkjet-printing device. In some implementations of the above aspect, the optical element is a gradient index (GRIN) device, including a GRIN device operational in one or more of the x-ray, ultraviolet, visible, near-infrared, thermal infrared, terahertz, or radio-frequency spectral ranges.

Another aspect of this disclosure is directed to a method for making an optical element. The method comprises: (a) receiving in a printing device a plurality of liquids, each including a volatile solvent, wherein one or more of the liquids also includes a sol-gel precursor; (b) receiving in the printing device a plurality of print maps corresponding to the plurality of liquids, each print map defining a pattern of application of the corresponding liquid for a series of pre-sintered layers of the optical element; (c) for each pre-sintered layer, operating the printing device to: (i) deposit the plurality of liquids according to the patterns defined in the plurality of print maps for that pre-sintered layer, and (ii) dry the pre-sintered layer; and (d) sintering the series of pre-sintered layers to form a vitreous monolith comprising the optical element.

In some implementations of the above aspect, depositing the plurality of liquids forms a sol-gel.

It will be understood that the configurations and/or approaches described herein are exemplary in nature, and that these specific examples are not to be considered in a limiting sense, because numerous variations are possible. The specific routines or methods described herein may represent one or more of any number of processing strategies. As such, various acts illustrated and/or described may be conducted in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for making an optical element, the method comprising:
   receiving in a printing device a plurality of liquids, each liquid including a volatile solvent and a non-polymerizable matrix, wherein one or more of the liquids also includes a suspension of particles;
   receiving in the printing device a plurality of print maps corresponding to the plurality of liquids, each print map defining a pattern of application of the corresponding liquid for a series of pre-sintered layers of the optical element;

for each pre-sintered layer, operating the printing device to:
deposit the plurality of liquids as a plurality of spatially patterned droplets according to the patterns defined in the plurality of print maps for that pre-sintered layer, and
use a drying source to dry the pre-sintered layer to remove the volatile solvent from the spatially patterned droplets; and
sintering the series of pre-sintered layers to form a vitreous monolith comprising the optical element.

2. The method of claim 1 wherein the one or more of the liquids comprise nanoparticles, and wherein the vitreous monolith has a spatially varying refractive index profile.

3. The method of claim 1 wherein depositing the plurality of liquids as the plurality of spatially patterned droplets comprises depositing the plurality of liquids from different printheads of the printing device, and wherein different liquids deposited from different printheads are allowed to interdiffuse before the pre-sintered layer is dried to remove the volatile solvent from the spatially patterned droplets.

4. The method of claim 3 wherein depositing the plurality of liquids as the plurality of spatially patterned droplets comprises depositing the plurality of liquids in pre-determined volumetric ratios, providing an optical element with a predetermined spatially patterned spectral-dielectric response.

5. The method of claim 3 wherein depositing the plurality of liquids as the plurality of spatially patterned droplets comprises depositing the plurality of liquids in pre-determined volumetric ratios, providing an optical element with predetermined spatially patterned refractive-index and dispersion values.

6. The method of claim 3 wherein the series of pre-sintered layers, after interdiffusion and sintering, provide a gradient composition and corresponding gradient-dielectric properties along one or more axes.

7. The method of claim 6 wherein the gradient dielectric properties are not symmetric along any axis.

8. The method of claim 2 wherein the nanoparticles comprise one or more of metal, semiconductor, or metal materials.

9. The method of claim 2 wherein the nanoparticles comprise one or more quantum-confined nanocrystals smaller than a Bohr radius of a material of the nanoparticles.

10. The method of claim 1 further comprising poling the pre-sintered layer by applying an electric or magnetic field to the pre-sintered layer to align dipoles of the pre-sintered layer.

11. The method of claim 2 wherein the nanoparticles include glass nanoparticles.

12. The method of claim 1 wherein a viscosity of each of the plurality of liquids is below 100 cPoise.

13. The method of claim 1 wherein depositing the plurality of liquids as the plurality of spatially patterned droplets comprises depositing the plurality of spatially patterned droplets as droplets having a drop volume less than 25 picoliters.

14. The method of claim 1 further comprising operating the printing device to form a border usable as a reservoir to contain the plurality of liquids of at least one of the pre-sintered layers.

15. The method of claim 1 wherein drying the pre-sintered layer to remove the volatile solvent from the spatially patterned droplets comprises photonic curing and/or drying.

16. The method of claim 1 wherein drying the pre-sintered layer to remove the volatile solvent from the spatially patterned droplets comprises drying via radio-frequency, microwave, or millimeter-wave radiation, at least in part.

17. The method of claim 1 further comprising doping at least one dried, pre-sintered layer via operation of the printing device, atomic-layer deposition, chemical-vapor deposition, and/or solution-based doping.

18. The method of claim 1 wherein sintering the series of pre-sintered layers comprises sintering via a laser or other photonic source.

19. The method of claim 18 further comprising partially vitrifying at least one dried, pre-sintered layer before application of a subsequent layer.

20. The method of claim 1 wherein depositing the plurality of liquids comprises depositing onto a pre-existing optical device.

21. The method of claim 1 wherein the plurality of liquids comprises a plurality of solutes, and wherein adjacently deposited solutes have coefficients of thermal expansion within 20% of each other.

22. The method of claim 1 wherein sintering the series of pre-sintered layers comprises chemical sintering to densify the optical element before final vitrification.

23. The method of claim 1 wherein the printing device comprises an inkjet-printing device.

24. A method for making an optical element, the method comprising:
receiving in a printing device a plurality of liquids, each liquid including a volatile solvent, wherein one or more of the liquids also includes a sol-gel precursor;
receiving in the printing device a plurality of print maps corresponding to the plurality of liquids, each print map defining a pattern of application of the corresponding liquid for a series of pre-sintered layers of the optical element;
for each pre-sintered layer, operating the printing device to:
deposit the plurality of liquids as a plurality of spatially patterned droplets according to the patterns defined in the plurality of print maps for that pre-sintered layer, and
use a drying source to dry the pre-sintered layer to remove the volatile solvent from the spatially patterned droplets; and
sintering the series of pre-sintered layers to form a vitreous monolith comprising the optical element.

25. The method of claim 24 wherein depositing the plurality of liquids forms a sol-gel.

* * * * *